(12) United States Patent
Heidt et al.

(10) Patent No.: US 9,154,564 B2
(45) Date of Patent: Oct. 6, 2015

(54) INTERACTING WITH A SUBSCRIBER TO A SOCIAL NETWORKING SERVICE BASED ON PASSIVE BEHAVIOR OF THE SUBSCRIBER

(75) Inventors: Ian R. Heidt, Carlsbad, CA (US); Eric P. Bilange, San Diego, CA (US); Eric C. Rosen, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 99 days.

(21) Appl. No.: 13/299,125

(22) Filed: Nov. 17, 2011

(65) Prior Publication Data

US 2012/0131183 A1    May 24, 2012

Related U.S. Application Data

(60) Provisional application No. 61/415,342, filed on Nov. 18, 2010.

(51) Int. Cl.

| | |
|---|---|
| *G06F 15/173* | (2006.01) |
| *H04L 29/08* | (2006.01) |
| *H04L 29/06* | (2006.01) |
| *H04W 4/00* | (2009.01) |
| *H04W 4/02* | (2009.01) |

(Continued)

(52) U.S. Cl.
CPC .............. *H04L 67/22* (2013.01); *H04L 67/306* (2013.01); *H04L 63/0407* (2013.01); *H04W 4/001* (2013.01); *H04W 4/02* (2013.01); *H04W 4/20* (2013.01); *H04W 12/02* (2013.01)

(58) Field of Classification Search
None
See application file for complete search history.

(56) References Cited

U.S. PATENT DOCUMENTS

| | | |
|---|---|---|
| 7,802,290 B1 | 9/2010 | Bansal et al. |
| 7,844,671 B1 | 11/2010 | Lawler et al. |
| 8,019,692 B2 * | 9/2011 | Rosen ........................... 705/319 |

(Continued)

FOREIGN PATENT DOCUMENTS

| | | |
|---|---|---|
| CN | 101840562 A | 9/2010 |
| EP | 2221734 A1 | 8/2010 |

(Continued)

OTHER PUBLICATIONS

"The Real Life Social Network" by Paul Adams, presented at Voices That Matter Web Design Conference, San Francisco, Jun. 29, 2010.

(Continued)

*Primary Examiner* — Kaveh Abrishamkar
*Assistant Examiner* — Janusz Kusyk
(74) *Attorney, Agent, or Firm* — Gerald P. Joyce, III

(57) ABSTRACT

In an embodiment, an application server is configured to manage privacy settings of a subscriber for one or more social networking services. The application server determines a set of privacy settings (e.g., a manually configured or default set of privacy settings) of the subscriber for the one or more social networking services, and then receives, from the subscriber, permission to dynamically modify the set of privacy settings. The application server monitors, responsive to the received permission, passive behavior of the subscriber that is separate from interactions between the subscriber and the one or more social networking services (e.g., calls, text messages, instant messages made to/from the subscriber, a location of the subscriber, etc.). The application server triggers a modification to the set of privacy settings based on the monitored passive behavior of the subscriber.

24 Claims, 25 Drawing Sheets

(51) Int. Cl.
*H04W 4/20* (2009.01)
*H04W 12/02* (2009.01)

(56) References Cited

U.S. PATENT DOCUMENTS

| | | | |
|---|---|---|---|
| 8,050,690 B2* | 11/2011 | Neeraj | 455/456.1 |
| 2004/0203768 A1* | 10/2004 | Ylitalo et al. | 455/435.1 |
| 2007/0218891 A1* | 9/2007 | Cox | 455/422.1 |
| 2008/0307481 A1 | 12/2008 | Panje | |
| 2009/0070334 A1* | 3/2009 | Callahan et al. | 707/9 |
| 2009/0113319 A1 | 4/2009 | Dawson et al. | |
| 2009/0163183 A1 | 6/2009 | O'Donoghue et al. | |
| 2009/0191898 A1 | 7/2009 | Lewis et al. | |
| 2009/0281988 A1* | 11/2009 | Yoo | 707/3 |
| 2010/0056183 A1 | 3/2010 | Oh | |
| 2010/0077484 A1* | 3/2010 | Paretti et al. | 726/26 |
| 2010/0125603 A1 | 5/2010 | Lehikoinen et al. | |
| 2010/0145947 A1 | 6/2010 | Kolman et al. | |
| 2010/0211563 A1* | 8/2010 | Macchietti et al. | 707/722 |
| 2010/0306834 A1* | 12/2010 | Grandison et al. | 726/7 |
| 2011/0238755 A1* | 9/2011 | Khan et al. | 709/204 |
| 2011/0311049 A1* | 12/2011 | Amaudruz et al. | 380/255 |
| 2012/0131155 A1* | 5/2012 | Madey et al. | 709/220 |
| 2012/0135775 A1* | 5/2012 | Drozt et al. | 455/518 |

FOREIGN PATENT DOCUMENTS

| | | |
|---|---|---|
| JP | 2008177713 A | 7/2008 |
| JP | 2009296674 A | 12/2009 |
| JP | 2010539738 A | 12/2010 |
| JP | 2010539739 A | 12/2010 |
| TW | 200941257 A | 10/2009 |
| TW | 201031169 A | 8/2010 |
| WO | 2009023701 A2 | 2/2009 |
| WO | 2009134597 A2 | 11/2009 |

OTHER PUBLICATIONS

International Search Report and Written Opinion—PCT/US2011/061493—ISA/EPO—Apr. 12, 2012.
Taiwan Search Report—TW100142432—TIPO—Feb. 21, 2014.

* cited by examiner

INTERACTING WITH A SUBSCRIBER TO A SOCIAL NETWORKING SERVICE BASED ON PASSIVE BEHAVIOR OF THE SUBSCRIBER

CLAIM OF PRIORITY UNDER 35 U.S.C. §119

The present Application for Patent claims priority to Provisional Application No. 61/415,342 entitled "INTERACTING WITH A SUBSCRIBER TO A SOCIAL NETWORKING SERVICE BASED ON PASSIVE BEHAVIOR OF THE SUBSCRIBER" filed Nov. 18, 2010 and assigned to the assignee hereof and hereby expressly incorporated by reference herein in its entirety.

BACKGROUND OF THE INVENTION

1. Field of the Invention

Embodiments of the present invention are directed to interacting with a subscriber to a social networking service based on passive behavior of the subscriber.

2. Description of the Related Art

Due to the complex nature of social relationships and the uniqueness of people, it is very difficult to predict the preferences of subscribers to social networking services. Accordingly, conventional social networking services (e.g., Facebook, Twitter, MySpace, etc.) typically rely upon subscribers to input information associated with their social interests and desired privacy settings.

This can be relatively burdensome for the subscriber because, after registering to a particular social networking service, the subscriber must either accept default settings that are not customized to the subscriber, or else must enter his/her privacy settings and social interests (e.g., friends, hobbies, blogs of interest, etc.) before the social networking service can be used or accessed by the subscriber.

Also, managing privacy settings for a social networking service can be confusing for subscribers. For example, while the privacy policies of social networking services are often clarified either in an account-settings section of the service, subscribers are often surprised when their social networking services make certain information public to other individuals (e.g., friends, family, strangers, etc.) or entities (e.g., advertisers, etc.).

SUMMARY

In an embodiment, an application server is configured to manage privacy settings of a subscriber for one or more social networking services. The application server determines a set of privacy settings (e.g., a manually configured or default set of privacy settings) of the subscriber for the one or more social networking services, and then receives, from the subscriber, permission to dynamically modify the set of privacy settings. The application server monitors, responsive to the received permission, passive behavior of the subscriber that is separate from interactions between the subscriber and the one or more social networking services (e.g., calls, text messages, instant messages made to/from the subscriber, a location of the subscriber, etc.). The application server triggers a modification to the set of privacy settings based on the monitored passive behavior of the subscriber.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
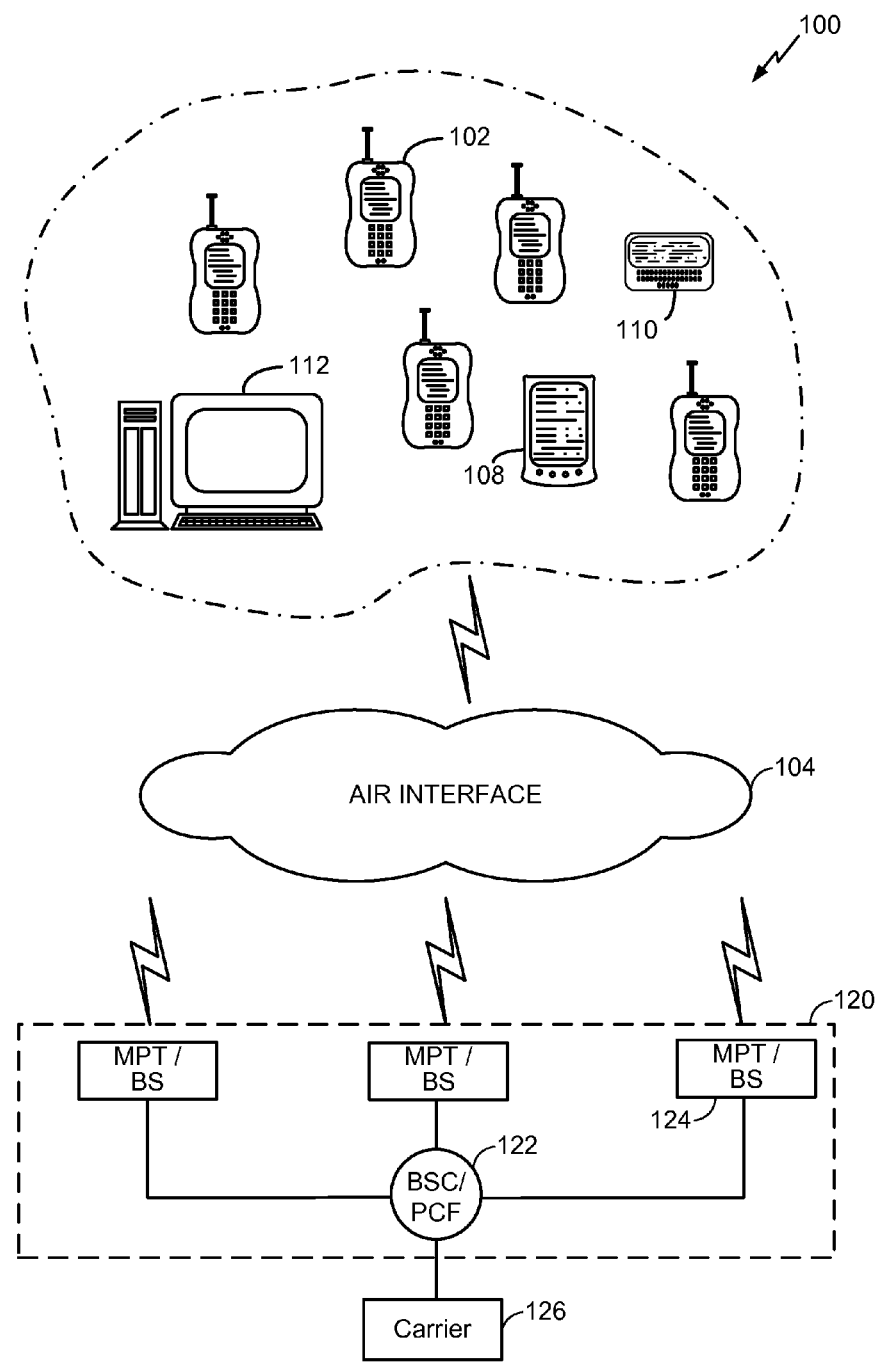
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 160 ("PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2A:
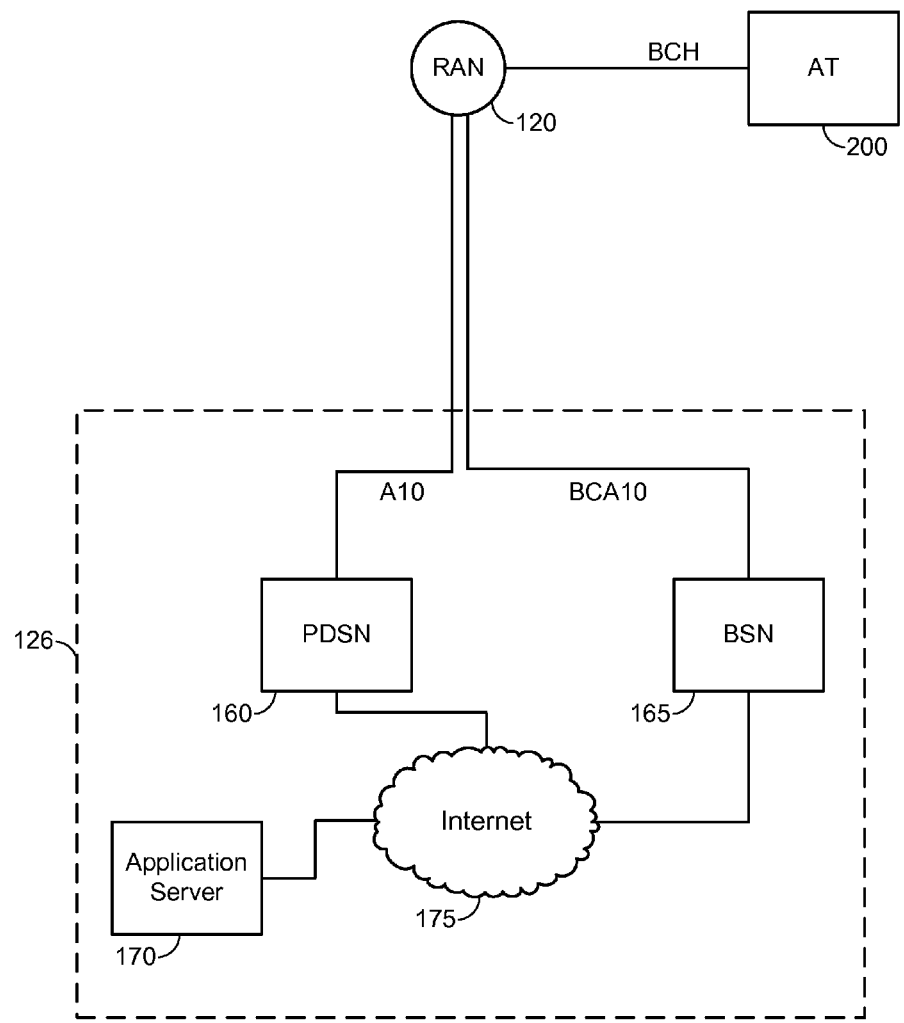
FIG. 2A illustrates a carrier network according to an embodiment of the present invention.

FIG. 2A illustrates the carrier network 126 according to an embodiment of the present invention. In the embodiment of FIG. 2A, the carrier network 126 includes a packet data serving node (PDSN) 160, a broadcast serving node (BSN) 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2A, the PDSN 160 may communicate with the RAN 120 (e.g., the BSC/PCF 122) via a conventional A10 connection. The A10 connection is well-known in the art and will not be described further for the sake of brevity.

Referring to FIG. 2A, the broadcast serving node (BSN) 165 may be configured to support multicast and broadcast services. The BSN 165 will be described in greater detail below. The BSN 165 communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 sends unicast messaging to the PDSN 160 via the Internet 175, and sends multicast messaging to the BSN 165 via the Internet 175.

Generally, as will be described in greater detail below, the RAN 120 transmits multicast messages, received from the BSN 165 via the BCA10 connection, over a broadcast channel (BCH) of the air interface 104 to one or more access terminals 200.

Figure 2B:
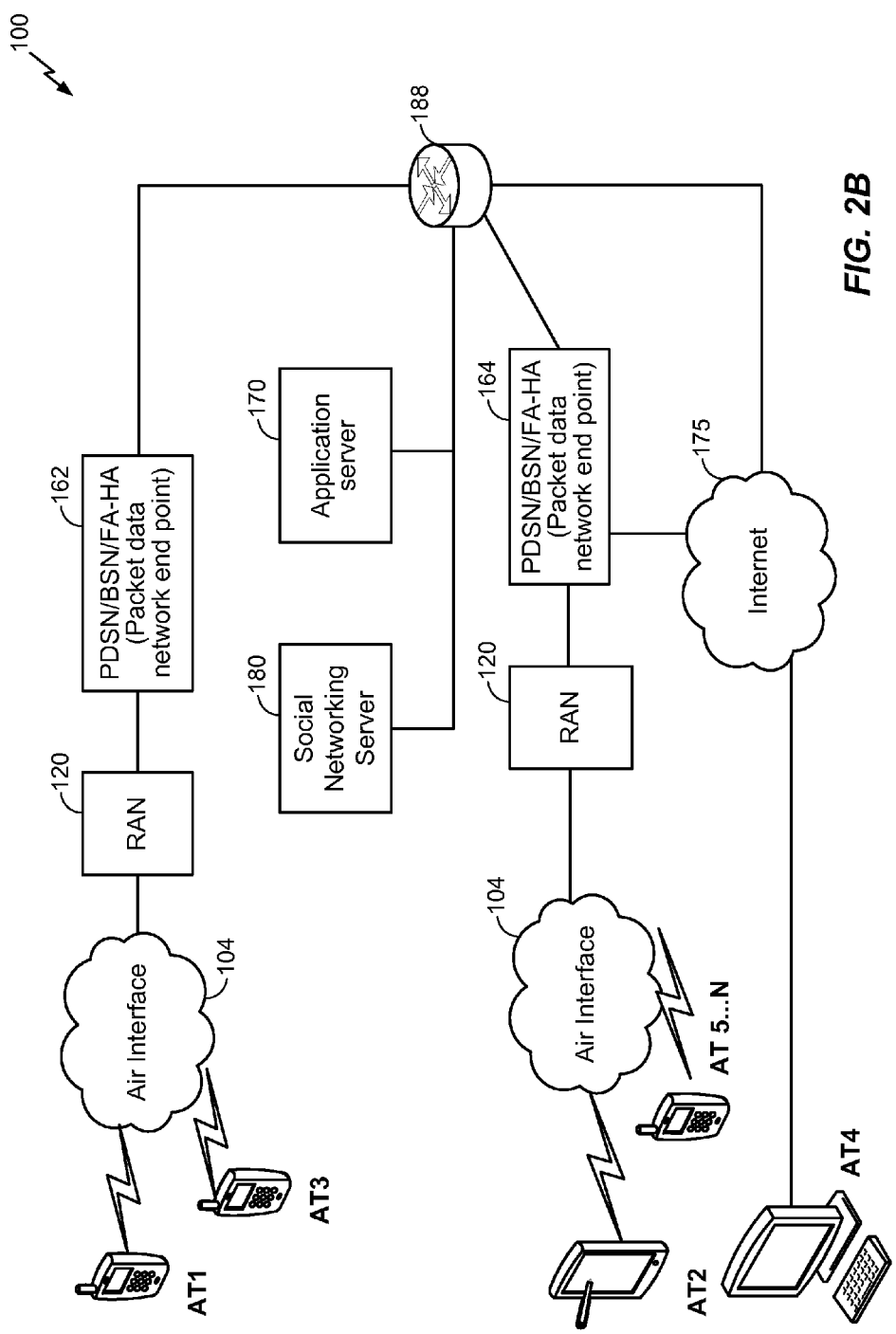
FIG. 2B illustrates an example of a wireless communications system in accordance with at least one embodiment of the invention.

FIG. 2B illustrates an example of the wireless communication 100 of FIG. 1 in more detail. In particular, referring to FIG. 2B, ATs 1...N are shown as connecting to the RAN 120 at locations serviced by different packet data network endpoints. Accordingly, ATs 1 and 3 connect to the RAN 120 at a portion served by a first packet data network end-point 162 (e.g., which may correspond to PDSN 160, BSN 165, a home agent (HA), a foreign agent (FA), etc.). The first packet data network end-point 162 in turn connects, via the routing unit 188, to the Internet 175 and/or to one or more of the application server 170 and one or more social networking servers 180 (e.g., a server or servers for supporting Facebook, MySpace, Twitter and/or other social networking services). ATs 2 and 5...N connect to the RAN 120 at a portion served by a second packet data network end-point 164 (e.g., which may correspond to PDSN 160, BSN 165, FA, HA, etc.). Similar to the first packet data network end-point 162, the second packet data network end-point 164 in turn connects, via the routing unit 188, to the Internet 175 and/or to one or more of the application server 170 and the one or more social networking servers 180. AT 4 connects directly to the Internet 175, and through the Internet 175 can then connect to any of the system components described above.

Referring to FIG. 2B, ATs 1, 3 and 5...N are illustrated as wireless cell-phones, AT 2 is illustrated as a wireless tablet-PC and AT 4 is illustrated as a wired desktop station. However, in other embodiments, it will be appreciated that the wireless communication system 100 can connect to any type of AT, and the examples illustrated in FIG. 2B are not intended to limit the types of ATs that may be implemented within the system. Also, while the application server 170 and the social networking server 180 are each illustrated as structurally separate servers, these servers may be consolidated in at least one embodiment of the invention.

Figure 2C:
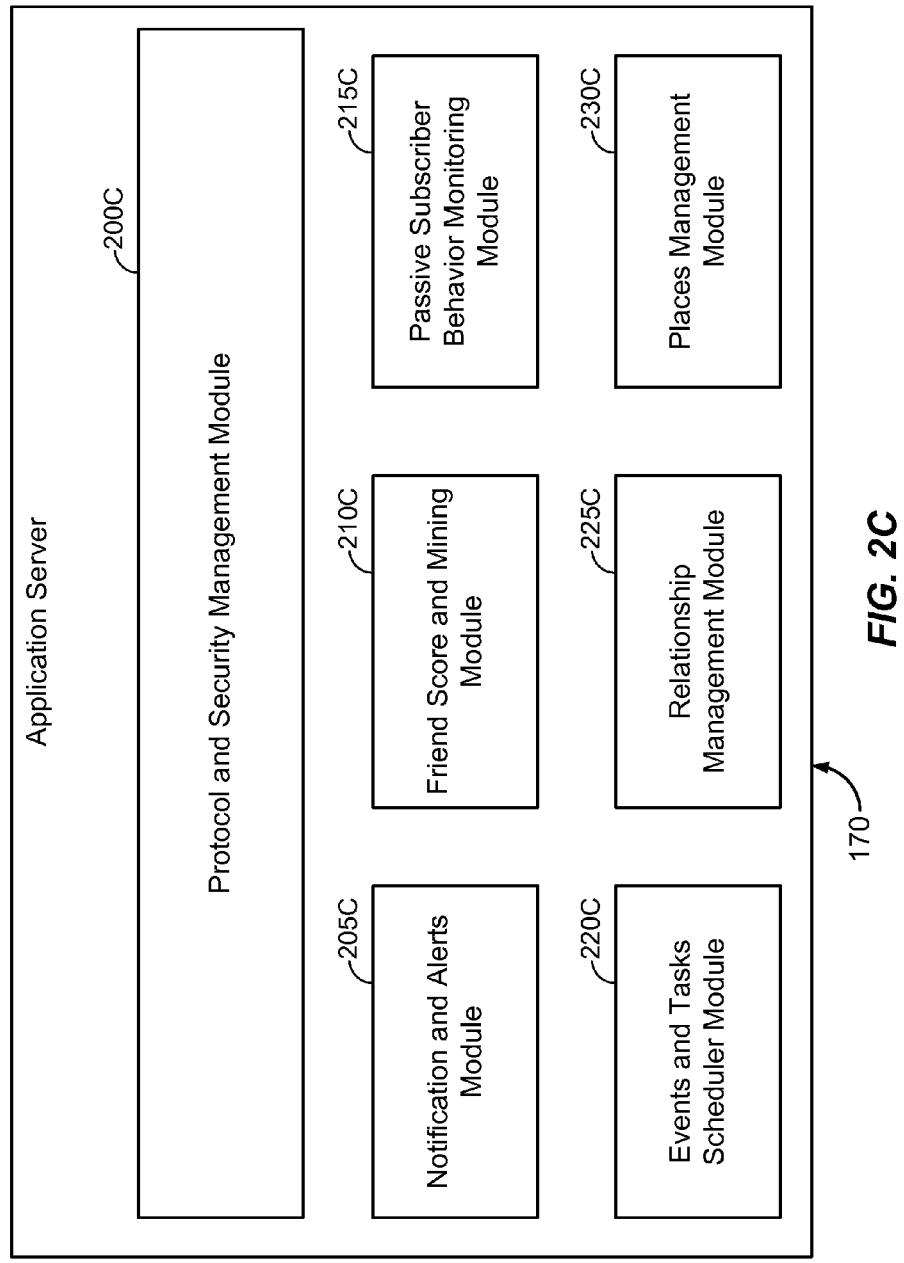
FIG. 2C illustrates an application server in accordance with an embodiment of the invention.

FIG. 2C illustrates the application server 170 in accordance with an embodiment of the invention. Referring to FIG. 2C, the application server 170 includes a protocol and security management module 200C, a notification and alerts module 205C, a friend-score and mining module 210C, a passive subscriber behavior monitoring module 215C, an events and tasks scheduler module 220C, a relationship management module 225C and a places management module 230C.

Referring to FIG. 2C, the protocol and security management module 200C is responsible for enforcing privacy settings for one or more subscribers to social networking services associated with the social networking servers 180.

Referring to FIG. 2C, the notification and alerts module 205C is responsible for sending notification or alerts to the one or more subscribers to social networking services associated with the social networking servers 180.

Referring to FIG. 2C, the friend-score and mining module 210C is determining scores or rankings associated with 'friends' or social contacts (e.g., family members, friends, business contacts, neighbors, etc.) of the one or more subscribers to social networking services associated with the social networking servers 180.

Referring to FIG. 2C, the passive subscriber behavior monitoring module 215C is responsible for tracking information associated with the one or more subscribers to social networking services associated with the social networking servers 180.

Referring to FIG. 2C, the events and tasks scheduler module 220C is responsible for determining information associated with tasks or events that are scheduled for participation by the one or more subscribers to social networking services associated with the social networking servers 180.

Referring to FIG. 2C, the relationship management module 225C is responsible for determining information associated with relationships of the one or more subscribers to social networking services associated with the social networking servers 180. The relationships monitored by the relationship management module 225C can include relationship to other individuals or social contacts (e.g., friends, family, neighbors, business contacts, etc.) and/or to groups (e.g., the Democrat or Republican party, a Homeowner's Association, etc.).

Referring to FIG. 2C, the places management module 230C is responsible for tracking locations that are associated with the one or more subscribers to social networking services associated with the social networking servers 180. For example, the places management module 230C can track locations in terms of geographic coordinates and/or addresses, or alternatively can attempt to log landmark-type information. For example, the places management module 230C can determine that a particular subscriber has traveled to 3401 34$^{th}$ Street, Washington D.C., and can then further determine that this address corresponds to a residential address associated with a particular social contact, or alternatively that this address corresponds to a commercial address associated with a particular service (e.g., a McDonalds restaurant, a Starbucks coffee shop, etc.).

As will be appreciated, the modules 200C through 230C of the application server 170 can interact with each other to achieve their respective functionality. The following description represents a few examples of interaction between the modules 200C through 230C. In example, the passive subscriber behavior monitoring module 215C may receive information that the places management module 230C uses to determine locations visited by the subscriber. One of these locations may correspond to a social contact of the subscriber, resulting in the friend score and mining module 210C increasing the social proximity ranking for that social contact. Also, if the events and tasks scheduler module 220C is aware of an upcoming event to be attended by the subscriber that is far away from the subscriber's current location, the events and tasks scheduler module 220C can request that the notification and alerts module 205C send a reminder to the subscriber related to the upcoming event. Further, if the location of the subscriber corresponds to a commercial entity, such as a plumbing service, the relationship management module 225C may automatically add the contact information (e.g., business address, phone number, date and time visited, etc.) into the subscriber's address book and/or contact list.

In another example, assume that the events and tasks scheduler module 220C determines the subscriber's current location corresponds to a meeting-place. In this case, the events and tasks scheduler module 220C can request that the protocol and security management module 200C temporarily augment the privacy settings of the subscriber such that more information can be shared between the subscriber and other subscribers at the same meeting. Thus, if the subscriber is lecturing at the meeting via PowerPoint slides, the subscriber can more easily share the PowerPoint slides (and/or other supplement lecture information) to the participants at the meeting.

The above-examples of the interaction between the modules of the application server 170 will be described in more detail below.

Figure 3:
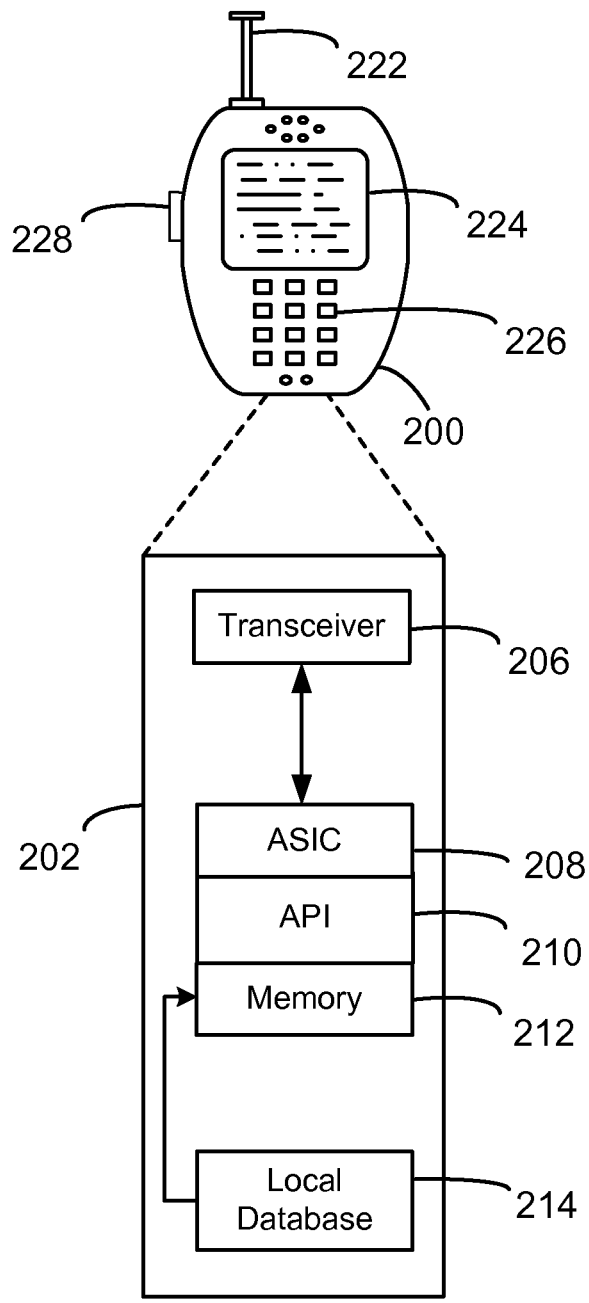
FIG. 3 illustrates an access terminal in accordance with an embodiment of the invention.

Referring to FIG. 3, an access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit (ASIC) 208, or other processor, microprocessor, logic circuit, or other data processing device. The ASIC 208 or other processor executes the application programming interface (API) 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3 are to be considered merely illustrative and the invention is not limited to the illustrated features or arrangement.

The wireless communication between the access terminal 102 and the RAN 120 can be based on different technologies, such as code division multiple access (CDMA), WCDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

To provide context for embodiments of the invention, several conventional social networking access procedures will be described with respect to FIGS. 4A through 4D.

Figure 4A:
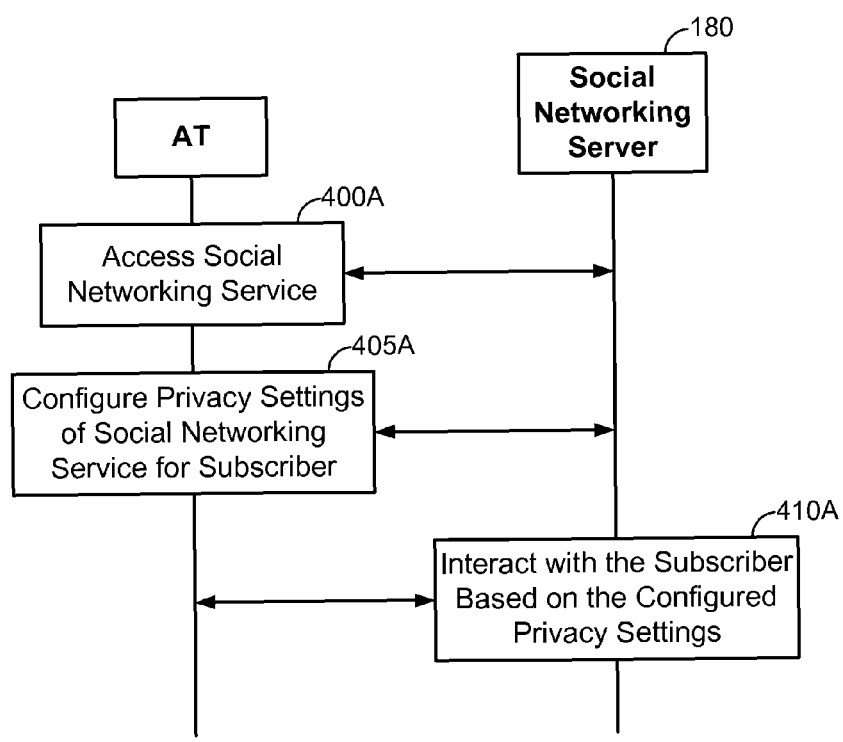
FIG. 4A illustrates a conventional manner by which privacy settings for a subscriber to a social networking service are established.

FIG. 4A illustrates a conventional manner by which privacy settings for a subscriber to a social networking service are established. Referring to FIG. 4A, a subscriber accesses a social networking service (e.g., Facebook, Twitter, etc.) that is supported by the social networking server 180 via an AT (e.g., a desktop computer, a laptop computer, a mobile phone, etc.), 400A. For example, the subscriber can access the social networking service by logging into a website hosted by the social networking server 180, or alternatively by loading a mobile client application that is configured to support a mobile version of the social networking service, which in turn connects to the social networking server 180.

In 405A, the subscriber, via the AT, configures privacy settings of the social networking service. For example, if the access in 400A corresponds to an initial registration of the subscriber to the social networking service, the configuring of 405A can include the subscriber manually indicating his/her desired privacy settings via some type of menu screen. In another example, if the access in 400A corresponds to an initial registration of the subscriber to the social networking service, the configuring of 405A can include the subscriber accepting default privacy settings established by the social networking service. In another example, if the access in 400A does not correspond to an initial registration of the subscriber to the social networking service, the configuration of 405A can be automatic in the sense that previously established privacy settings are loaded by the social networking server 180 for the subscriber.

After establishing the privacy settings for the subscriber in 405A, the subscriber, via the AT, and the social networking server 180 interact with each other based on the established privacy settings, 410A. For example, if the privacy settings specify that one or more other subscribers are friends, the interaction can include sharing information associated with the one or more other subscribers (if permitted to do so by the one or more other subscribers' own privacy settings). In another example, if the privacy settings specify that one or more other subscribers are blocked, the social networking server 180 can ensure that the blocked subscribers receive no information directly related to the subscriber.

Figure 4B:
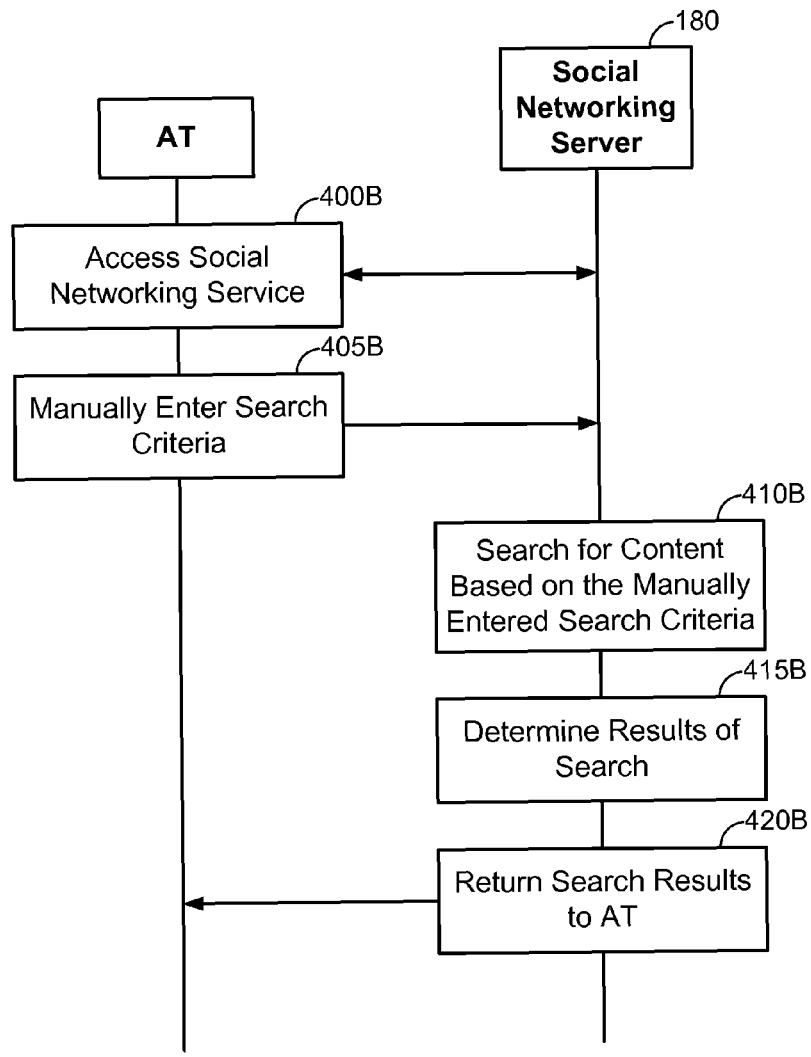
FIG. 4B illustrates a conventional manner by which a subscriber to a social networking service searches for content.

FIG. 4B illustrates a conventional manner by which a subscriber to a social networking service searches for content. Referring to FIG. 4B, a subscriber accesses a social networking service (e.g., Facebook, Twitter, MySpace, etc.) that is supported by the social networking server 180 via an AT (e.g., a desktop computer, a laptop computer, a mobile phone, etc.), 400B. For example, the subscriber can access the social networking service by logging into a website hosted by the social networking server 180, or alternatively by loading a mobile client application that is configured to support a mobile version of the social networking service, which in turn connects to the social networking server 180.

In 405B, assume that the subscriber determines to search for content by the social networking service. Accordingly, the subscriber manually enters search criteria into the AT, and the AT sends the manually entered search criteria to the social networking server 180 in 405B. In an example, the manually entered search criteria may be the name of a social contact and/or any other type of input that can be used by the social networking server 180 to conduct a search.

The social networking server 180 receives the manually entered search criteria from the AT and performs a content search based on the manually entered search criteria, 410B. For example, if the manually entered search criteria correspond to the name of a social contact, the social networking server 180 can search a social networking database to retrieve information associated with the social contact identified by the manually entered search criteria. The social networking server 180 determines the result of the content search (if any), 415B, and the social networking server 180 then sends the search results to the AT for presentation to the subscriber, 420B.

Figure 4C:
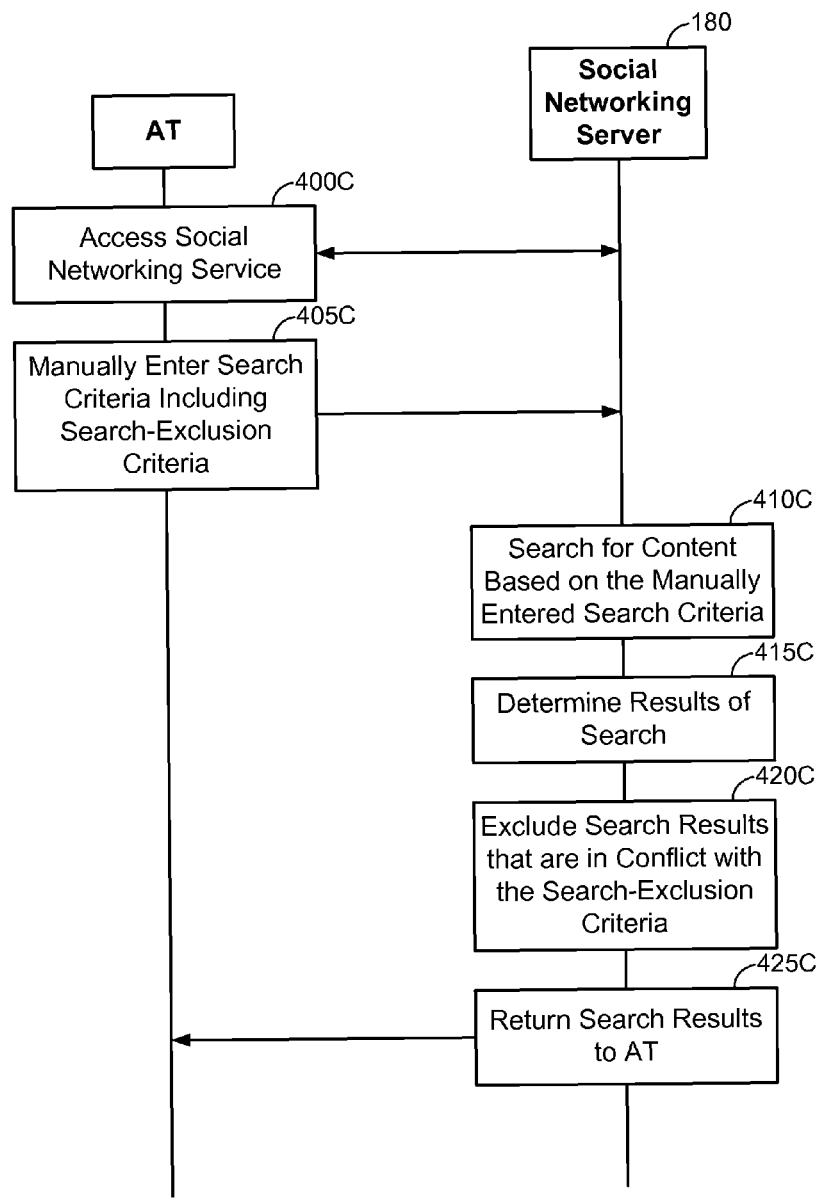
FIG. 4C illustrates another conventional manner by which a subscriber to a social networking service searches for content.

FIG. 4C illustrates another conventional manner by which a subscriber to a social networking service searches for content. Referring to FIG. 4C, a subscriber accesses a social networking service (e.g., Facebook, Twitter, MySpace, etc.) that is supported by the social networking server 180 via an AT (e.g., a desktop computer, a laptop computer, a mobile phone, etc.), 400C. As in 405B of FIG. 4B, in 405C, assume that the subscriber determines to search for content by the social networking service. Accordingly, the subscriber manually enters search criteria into the AT, and the AT sends the manually entered search criteria to the social networking server 180 in 405C. However, in 405C, the manually entered search criteria further includes search-exclusion criteria that are intended to function as a filter for the search results. For example, the manually entered search criteria may be a query to obtain information related to social contacts with a first name of "Joe", and the search-exclusion criteria may be to exclude information associated with business contacts from the search results (i.e., business contacts named "Joe" are excluded) and/or to only include information associated with family contacts in the search results (i.e., which results in exclusion of other types of social contacts).

The social networking server 180 receives the manually entered search criteria, along with the search-exclusion criteria, from the AT and performs a content search based on the manually entered search criteria, 410C. The social networking server 180 determines the result of the content search (if any), 415C, and then excludes or removes any search results that are in conflict with the search exclusion criteria, 420C. The social networking server 180 then sends any remaining search results to the AT for presentation to the subscriber, 425C.

Figure 4D:
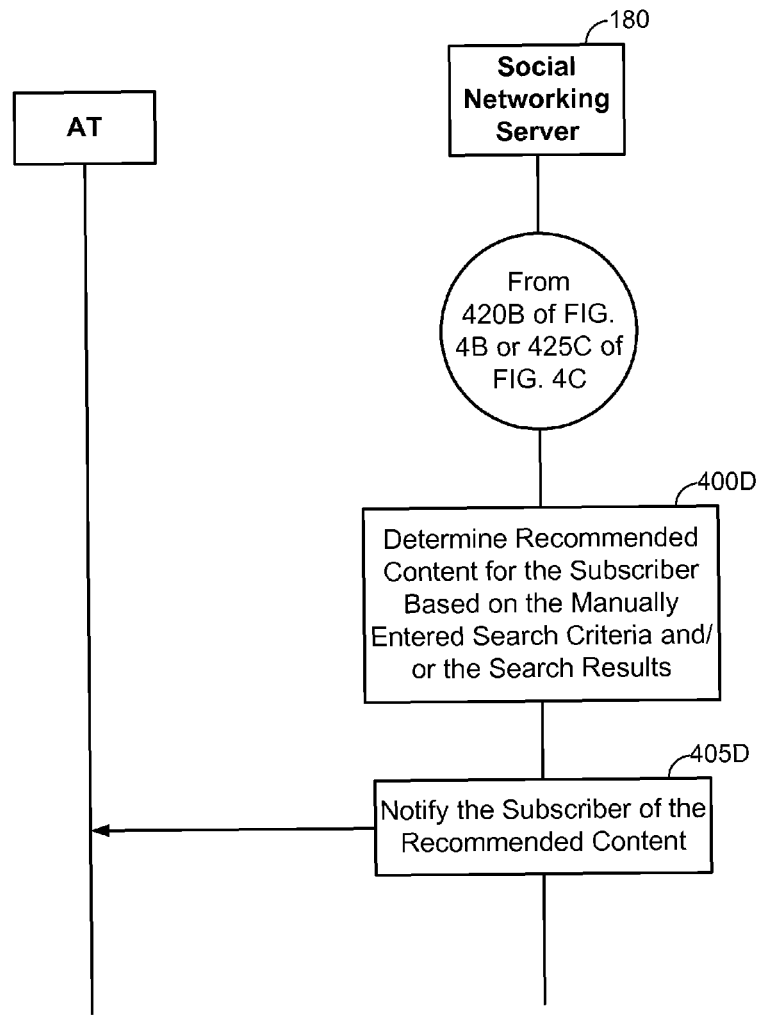
FIG. 4D illustrates a continuation of the process of FIG. 4B and/or FIG. 4C.

FIG. 4D illustrates a continuation of the process of FIG. 4B and/or FIG. 4C. In FIG. 4D, in parallel with providing the search results that were explicitly requested by the subscriber via the manually entered search criteria, the social networking server 180 also attempts to determine information that was not explicitly requested by the subscriber but has a relatively high likelihood of being of interest to the subscriber based on the configuration of the manually entered search criteria.

Accordingly, in 400D, the social networking server 180 further determines recommended content for the subscriber based on the manually entered search criteria from 405B of FIG. 4B or 405C of FIG. 4C and/or the search results from 420B of FIG. 4B or 425C of FIG. 4C. For example, if the manually entered search criteria are for a type of product or service, the recommended content may be related to the particular product or service in some manner. For example, if the particular service is plumbing, the recommended content may correspond to local plumbers in proximity to the subscriber (i.e., targeted advertising). In another example, if the manually entered search criteria includes a social contact that is associated with a given fraternity or sorority, the recommended content may be a notification of other social contacts in the same given fraternity or sorority. After determining the recommended content for the subscriber in 400D, the social networking server 180 sends the recommended content to the AT for presentation to the subscriber, 405D.

As will be appreciated from the description of FIGS. 4A through 4D, conventional social networking services rely upon explicit or implicit requests from subscribers to implement privacy settings and/or provision and share content between subscribers. Embodiments of the invention are directed to mechanisms for predicting a subscriber's preferences regarding privacy settings and/or content sharing and provisioning based at least in part upon passive behavior of the subscriber. Thus, instead of relying upon some type of request by the subscriber to perform an action, the social networking service in accordance with an embodiment of the invention will attempt to infer that the action would be desired by the subscriber and then perform the action in advance of any such request (implicit or explicit).

Figure 5A:
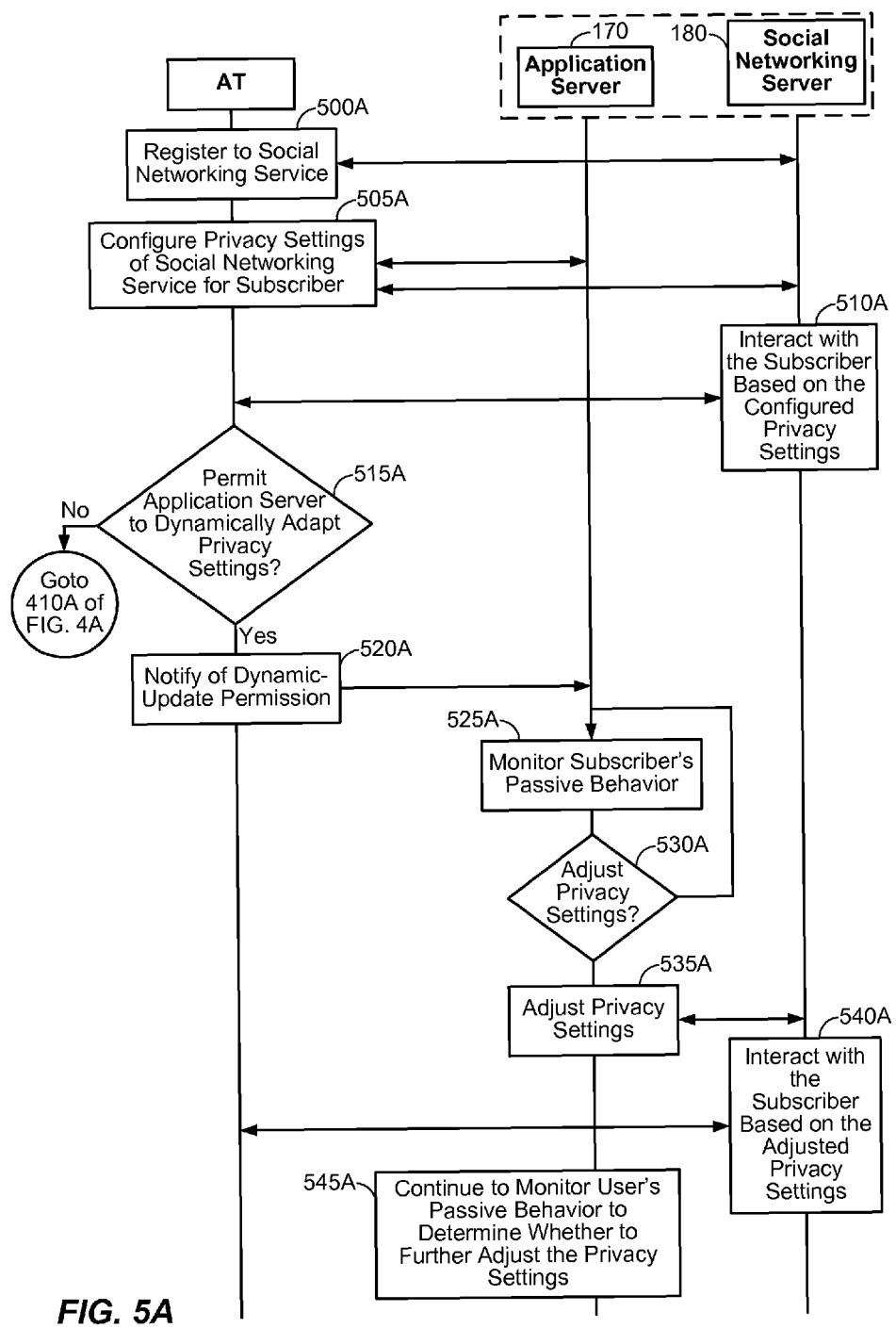
FIG. 5A illustrates a manner by which privacy settings for a subscriber to a social networking service can be dynamically updated based on a subscriber's passive behavior in accordance with an embodiment of the invention.
Figure 5B:
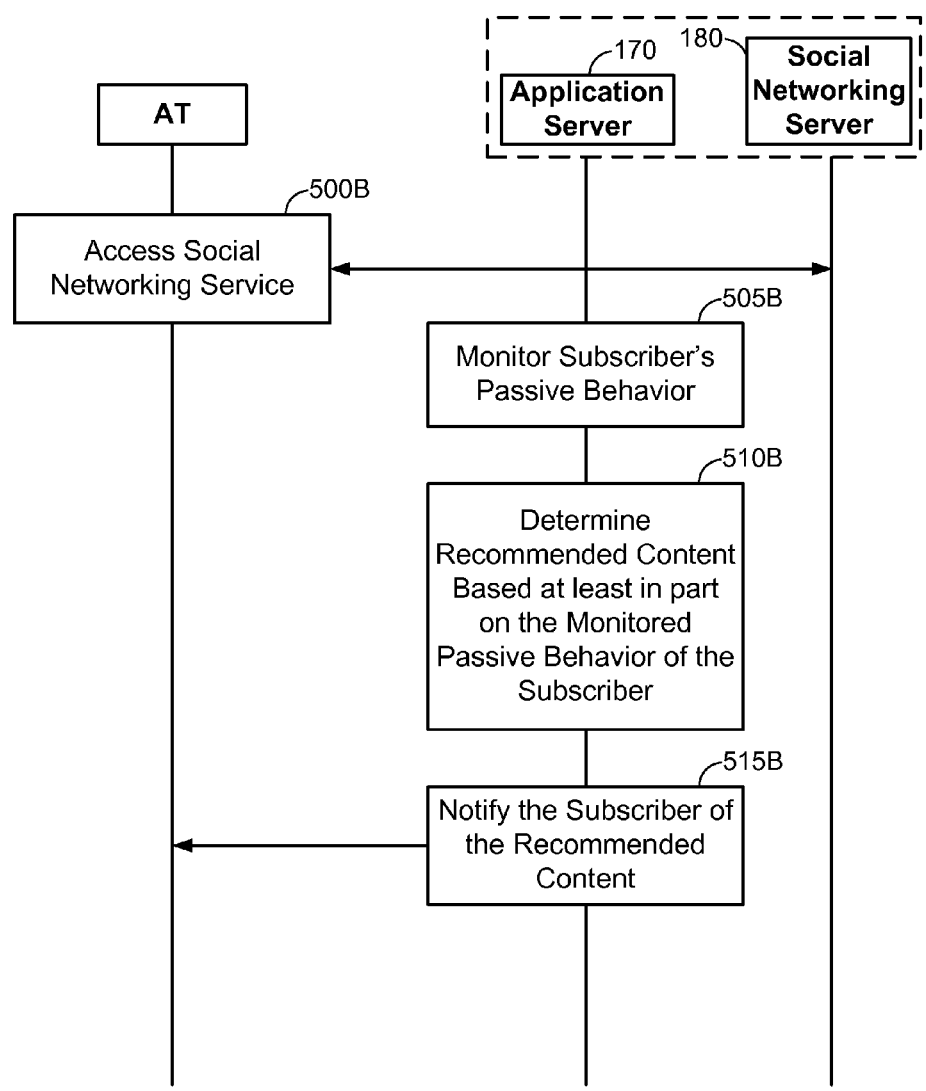
FIG. 5B illustrates a process of recommending content to a subscriber of a social networking service in accordance with an embodiment of the invention.
Figure 5C:
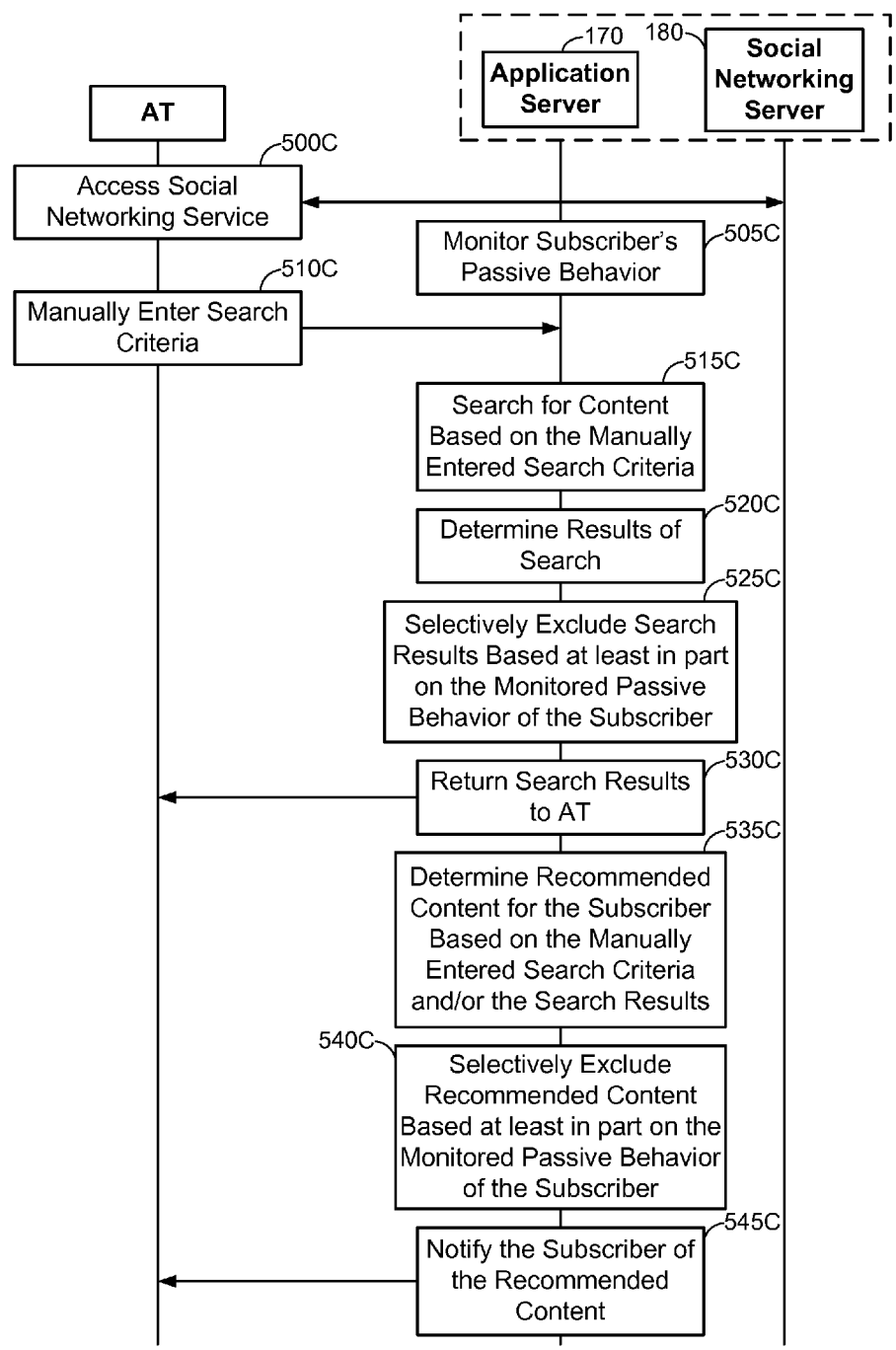
FIG. 5C illustrates a process by which a subscriber can search for content associated with a social networking service in accordance with an embodiment of the invention.

In FIGS. 4A through 4D, the subscriber is described as directly interacting with the social networking server 180 to establish his/her privacy settings and to obtain requested and/or recommended content. In FIGS. 5A through 5C, the subscriber is described as interacting, through an AT, with the application server 170. While the application server 170 can be implemented within the social networking server 180 (e.g., one or more servers supporting Facebook, Twitter, MySpace, etc.) in one embodiment, it is also possible that the application server 170 can be a separate entity that is configured to manage the privacy settings and content settings of the subscriber across one (or more) of the social networking services. In the description of FIGS. 5A through 5C, the application server 170 may be configured as illustrated and described above with respect to FIG. 2C, such that the application server 170 includes the modules 200C through 230C. However, it will be appreciated that this is merely representative of one example implementation of the application server 170, which can include different modular configurations in other embodiments of the invention.

FIG. 5A illustrates a manner by which privacy settings for a subscriber to a social networking service can be dynamically updated based on a subscriber's passive behavior in accordance with an embodiment of the invention. As used herein, 'passive behavior' corresponds to the subscriber's interaction with his/her AT that is not directly related to a social networking service(s) of the subscriber. For example, if the subscriber loads a client application that is configured to interface with the social network server 180 and then, through the client application, updates social networking privacy settings, searches for content, etc. this can be considered 'active' or direct behavior with respect to the social networking service(s). On the other hand, if the subscriber carries the AT to various locations, exchanges information with friends or business contacts (e.g., via Email, Instant Message (IM), SMS or Text messaging, MMS messaging, etc.), this can be considered to be passive behavior on the part of the subscriber with respect to the social networking service(s).

Referring to FIG. 5A, in 500A, a subscriber performs an initial registration to a social networking service (e.g., Facebook, Twitter, MySpace, etc.) that is supported by the social networking server 180 via an AT (e.g., a desktop computer, a laptop computer, a mobile phone, etc.). For example, the subscriber can register to the social networking service via a website hosted by the social networking server 180, or alternatively via a mobile application that is configured to support a mobile version of the social networking service.

In 505A, the subscriber, via the AT, configures privacy settings of the social networking service. Depending on the implementation of the application server 170 and the social networking server 180, the configuration of 505A can involve communications between the AT and the application server 170, the social networking server 180, or both. For example, if the application server 170 is embedded within the social networking server 180, then the interaction associated with the configuration of 505A corresponds to an interaction between both the application server 170 and the social networking server 180.

In another example, the application server 170 can be separate from the social networking server 180 and can be used as a proxy for establishing the privacy settings of the social networking service supported by the social networking server 180. In this example, the subscriber, via the AT, can input his/her desired privacy settings to the application server 170, which can then instruct the social networking server 180 with regard to the subscriber's privacy settings.

In yet another example, the application server 170 can be separate from the social networking server 180 and the configuration of 505A can occur between the AT and the social networking server 180, after which the social networking server 180 can notify the application server 170 with regard to the initial configuration of privacy settings for the subscriber.

As noted above with respect to FIG. 5A, the establishment of the initial privacy settings upon registration of the subscriber to the social networking service can correspond to (i) an acceptance by the subscriber of default privacy settings for the social networking service, or (ii) a manual configuration of privacy settings customized to the preferences of the subscriber.

Irrespective of how the privacy settings are configured in 505A, after the application server 170 determines the privacy settings to be implemented for the subscriber in conjunction with the social networking service, the application server 170 updates one or more of modules 200C through 230C in 505A. For example, the protocol and security management module 200C can store the configured privacy settings for the subscriber in association with the social networking service, the places management module 230C can store a location of the subscriber at the time of the registration (if available), and so on.

In 510A, as in 410A of FIG. 4A, the social networking server 180 begins interacting with the subscriber's AT based on the initial configuration of the privacy settings from 505A. Next, the subscriber determines whether to permit the application server 170 to dynamically adapt or update the subscriber's privacy settings for the social networking service, 515A. If the subscriber determines not to permit the application server 170 to dynamically adapt or update the subscriber's privacy settings for the social networking service in 515A, the process advances to 410A of FIG. 4A whereby the social networking server 180 and the subscriber's AT interact based on the configured privacy settings from 505A. Otherwise, if the subscriber determines to permit the application server 170 to dynamically adapt or update the subscriber's privacy settings for the social networking service in 515A, the AT notifies the application server 170 of the dynamic-update permission, 520A.

Referring to FIG. 5A, the application server 170 begins to monitor the subscriber's passive behavior, 525A. For example, in 525A, the passive subscriber behavior monitoring module 215C of the application server 170 can be executed to track the manner in which the subscriber is using the AT. The subscriber's passive behavior that is monitored by the passive subscriber behavior monitoring module 215C can include locations to which the subscriber has visited (e.g., via GPS tracking or some other type of location tracking) or is intending to visit (e.g., via a destination address input into a navigation application). In another example, the subscriber's passive behavior that is monitored by the passive subscriber behavior monitoring module 215C can include websites that the subscriber has accessed via the AT. In another example, the subscriber's passive behavior that is monitored by the passive subscriber behavior monitoring module 215C can include social contacts that have been accessed via the AT (e.g., whether the subscriber has called a particular social contact recently, whether the subscriber is in close physical proximity to one or more other social contacts, etc.). As will be appreciated, the types of passive subscriber behavior that can be monitored in 525A can include any type of subscriber behavior that is associated with the AT.

The application server 170 evaluates the monitored passive behavior of the subscriber to determine whether to dynamically adjust or update the current configuration of privacy settings for the subscriber, 530A. For example, the protocol and security management module 200C can evaluate the passive behavior that is monitored and logged by the passive subscriber behavior monitoring module 215C to perform the determination of 530A. As an example, assume that the passive subscriber behavior monitoring module 215C detects that the subscriber is in a scheduled business meeting with one or more other subscribers (e.g., this can be based on coordination between the passive subscriber behavior monitoring module 215C and the places management module 230C and events and tasks scheduler module 220C). In this case, the protocol and security management module 200C can determine to temporarily (e.g., for the duration of the meeting) augment the privacy permissions of the one or more other subscribers (or vice versa) to permit the meeting participants to more easily exchange information that may assist the meeting, such as presentation slides for example.

Accordingly, if the application server 170 determines not to adjust the privacy settings in 530A, the process returns to 525A and the application server 170 continues to monitor the subscriber's passive behavior. Otherwise, if the application server 170 determines to adjust the privacy settings in 530A, the application server 170 adjusts the privacy settings for the subscriber in 535A. The application server 170 can also, if necessary, notify the social networking server 180 with regard to the privacy settings adjustment in 535A. The social networking server 180 then begins interacting with the subscriber's AT based on the adjusted configuration of the privacy settings, 540A. The application server 170 continues to monitor the subscriber's passive behavior to determine whether to further adjust the privacy settings of the subscriber, 545A.

FIG. 5B illustrates a process of recommending content to a subscriber of a social networking service in accordance with an embodiment of the invention. Referring to FIG. 5B, assume that the subscriber, via the AT, accesses and begins some type of interaction with a social networking service (e.g., Facebook, Twitter, MySpace, etc.), 500B.

While the subscriber is accessing or interacting with the social networking service in 500B, the application server 170 monitors the subscriber's passive behavior, 505B. For example, as in 525A of FIG. 5A, the passive subscriber behavior monitoring module 215C of the application server 170 can be executed in 505B to track the manner in which the subscriber is using the AT. The subscriber's passive behavior that is monitored by the passive subscriber behavior monitoring module 215C can include locations to which the subscriber has visited (e.g., via GPS tracking or some other type of location tracking) or is intending to visit (e.g., via a destination address input into a navigation application). In another example, the subscriber's passive behavior that is monitored by the passive subscriber behavior monitoring module 215C can include websites that the subscriber has accessed via the AT. In another example, the subscriber's passive behavior that is monitored by the passive subscriber behavior monitoring module 215C can include social contacts that have been accessed via the AT (e.g., whether the subscriber has called a particular social contact recently, whether the subscriber is in close physical proximity to one or more other social contacts, etc.). As will be appreciated, the types of passive subscriber behavior that can be monitored in 505B can include any type of subscriber behavior that is associated with the AT.

The application server 170 evaluates the monitored passive behavior of the subscriber to determine recommended content to be sent to the subscriber's AT, 510B. For example, the notification and alerts module 205C of the application server 170 can evaluate the passive behavior that is monitored and logged by the passive subscriber behavior monitoring module 215C to perform the determination of 510B. As an example, assume that the passive subscriber behavior monitoring module 215C detects that the subscriber is in a scheduled business meeting with one or more other subscribers (e.g., this can be based on coordination between the passive subscriber behavior monitoring module 215C and the places management module 230C and events and tasks scheduler module 220C). In this case, the notification and alerts module 205C can determine to notify the subscriber of information associated with one or more other meeting participants. For example, virtual business cards of each other meeting participant can be sent to the subscriber (if permitted by the respective privacy settings of the other meeting participants) so that the subscriber will have a record of who attended the meeting and how to contact them in the future. After determining the content to recommend to the subscriber, the application server 170 sends a notification of the recommended content to the AT for presentation to the subscriber, 515B.

In an example, blocks 510B and 515B of FIG. 5B can be performed exclusively by the application server 170. In an alternative embodiment, the social networking server 180 may interact with the application server 170 to provide the recommended content to the subscriber. For example, the social networking server 180 may store the actual content to be recommended to the subscriber. In this case, the application server 170 and the social networking server 180 can coordinate to search for the recommended content and provision the recommended content to the AT based on the monitored passive behavior of the subscriber.

FIG. 5C illustrates a process by which a subscriber can search for content associated with a social networking service in accordance with an embodiment of the invention. Referring to FIG. 5C, a subscriber accesses a social networking service (e.g., Facebook, Twitter, etc.) that is supported by the social networking server 180 via an AT (e.g., a desktop computer, a laptop computer, a mobile phone, etc.), 500C. Similar to 505B of FIG. 5B, while the subscriber is accessing or interacting with the social networking service in 500C, the application server 170 monitors the subscriber's passive behavior, 505C.

Referring to FIG. 5C, as in 405B of FIGS. 4B and 405C of FIG. 4C, assume that the subscriber determines to search for content by the social networking service. Accordingly, the subscriber manually enters search criteria into the AT, and the AT sends the manually entered search criteria to the application server 170 in 510C. In the embodiment of FIG. 5C, unlike FIG. 4C, the subscriber need not explicitly indicate search-exclusion criteria as part of the manually entered search criteria because search results for exclusion will be inferred based on the monitoring from 505C, as will be discussed below in more detail.

The application server 170 receives the manually entered search criteria from the AT and performs a content search based on the manually entered search criteria, 515C. The application server 170 determines the result of the content search (if any), 520C. After obtaining the search results in 520C, the application server 170 selectively excludes or removes search results based on the passive behavior of the subscriber as monitored by the application server 170 in 505C, 525C.

For example, assume that the application server 170 tracks the movement of the subscriber's AT and determines that the subscribing is traveling to his or her workplace in 505C. Thus, the application server 170 infers that the subscriber will be at work during lunch. Next, assume that the manually entered search criteria in 510C are associated with lunch options for the subscriber. In this case, the search results correspond to restaurants (or other types of eateries) and the application server 170 may exclude, from the list of restaurants, any restaurants that are not expected to be available for lunch near the subscriber's workplace (e.g., restaurants that do not deliver to the subscriber's workplace, restaurants that are not walking distance to the subscriber's workplace, etc.). Turning back to FIG. 5C, after selectively excluding search results in 525C, the application server 170 sends any remaining search results to the AT for presentation to the subscriber, 530C.

In FIG. 5C, the application server 170 can further attempt to determine content for recommendation to the subscriber, 535C, based on the manually entered search criteria that is not technically a result of the search, but is still somehow related to the search. Accordingly, similar to 400D of FIG. 4D, the application server 170 determines recommended content for the subscriber based on the manually entered search criteria and/or the search results. Similar to 525C, the application server 170 can selectively exclude a portion of the recommended content based on the passive behavior of the subscriber as monitored by the application server 170 in 505C, 540C. After selectively excluding the portion of recommended content in 540C, the application server 170 can send any remaining recommended content to the AT for presentation to the subscriber, 545C.

In an example, blocks 515C through 545C can be performed exclusively by the application server 170. In an alternative embodiment, the social networking server 180 may interact with the application server 170 to provide the recommended content to the subscriber. For example, the social networking server 180 may store the actual content to be searched for based on the manually entered search criteria and/or the recommended content. In this case, the application server 170 and the social networking server 180 can coordinate to search for the content based on the manually entered search criteria and/or the recommended content and provision the recommended content to the AT based on the monitored passive behavior of the subscriber.

FIGS. 6A through 8D are directed to more detailed implementation examples of FIGS. 5A, 5B and 5C, respectively. In particular, FIGS. 6A through 6D illustrate more detailed implementation examples of FIG. 5A, FIGS. 7A through 7E illustrate more detailed implementation examples of FIG. 5B and FIGS. 8A through 8D illustrate more detailed implementation examples of FIG. 5C.

Figure 6A:
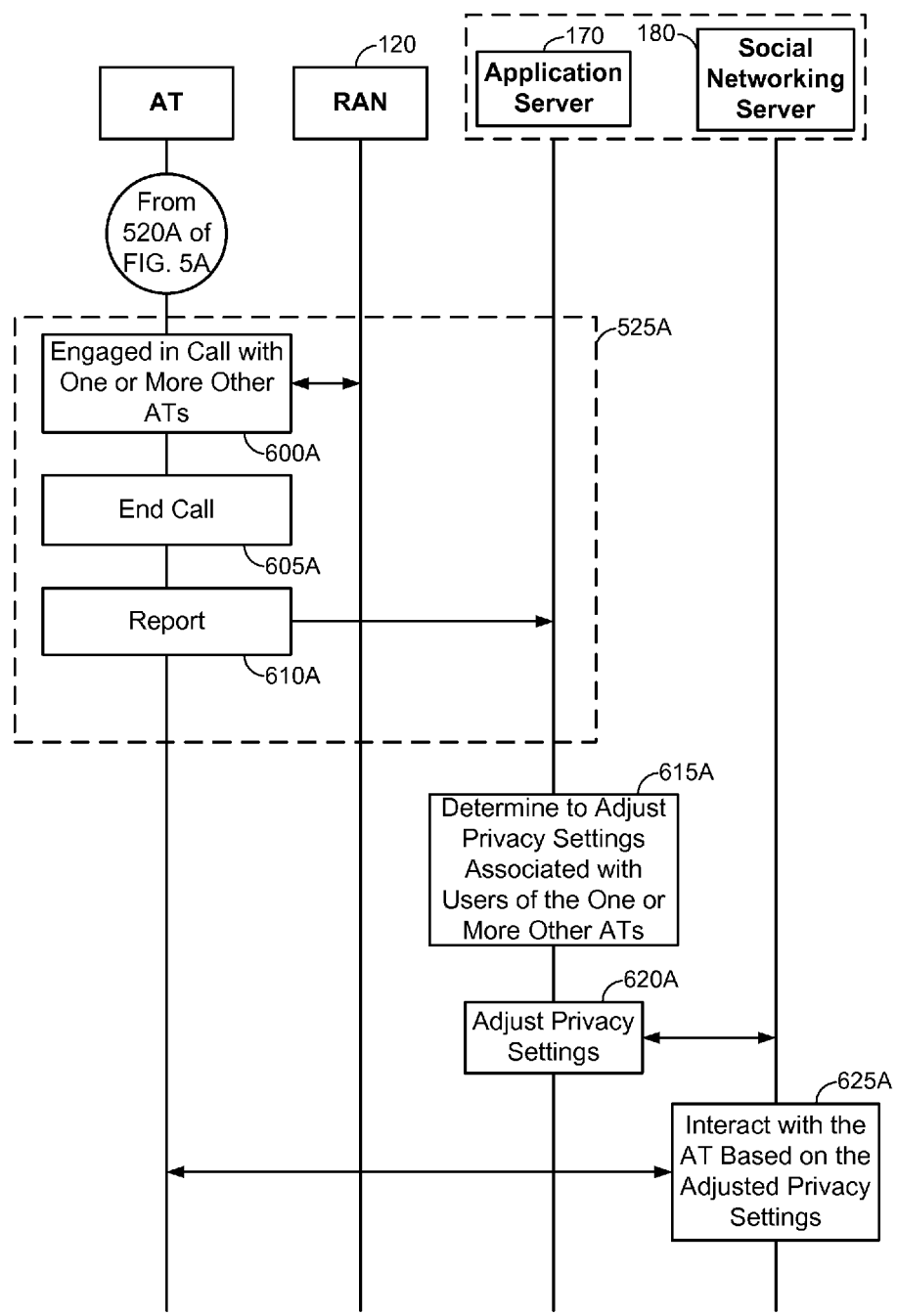
FIGS. 6A through 6D each illustrate an implementation example of FIG. 5A in accordance with embodiments of the invention.

Referring to FIG. 6A, assume that 500A through 520A of FIG. 5A are performed such that a given AT operated by a given subscriber is registered with one or more social networking services hosted by social networking server 180 and has authorized the application server 170 to manage his/her privacy settings for the one or more social networking services. After 520A of FIG. 5A, the process advances to 600A of FIG. 6A, whereby the given AT engages in a communication session (e.g., a phone call) with one or more other ATs (not shown). In an example, the communication session of 600A can be initiated by the given AT, or alternatively can be initiated by the one or more other ATs. After a period of time, the communication session is terminated, 605A.

Upon termination of the communication session in 605A, the given AT sends a call-information report to the application server 170, 610A. For example, the call-information report of 610A can notify the application server 170 that the communication session between the given AT and the one or more other ATs took place, and can also indicate call-specific information associated with the communication session. For example, the call-specific information can include the duration of the communication session, the identity of the call originator (e.g., an indication of whether the given AT or the one or more other ATs initiated the call) and so on. In the embodiment of FIG. 6A, 600A through 610A collectively correspond to the monitoring of the given subscriber's passive behavior of 525A of FIG. 5A, such that the passive behavior being monitored in FIG. 6A includes call participation by the given subscriber via the given AT.

In 615A, the application server 170 evaluates the monitored passive behavior of the subscriber (i.e., the subscriber's participation in the call from 600A) and determines to adjust or update the current configuration of privacy settings for the subscriber (e.g., similar to 530A of FIG. 5A). For example, the existence of the call between the given AT and the one or more other ATs may be an indicator of trust or a close social relationship between the respective call participants which may prompt the application server 170 to determine to relax the privacy settings or firewalls between the given subscriber and the users of the one or more other ATs. In another example, the call-specific information associated with the communication session can be taken into account by the application server 170 in addition to the mere recognition of the call's existence. For example, longer calls may be used to infer a closer social relationship as opposed to shorter calls, such that the call duration can be used to determine whether to update privacy settings for the given subscriber, or the magnitude by which the privacy settings of the given subscriber are to be updated. In another example, call repetition (e.g., 5 calls per day, 8 calls per week, etc.) can indicate a close social relationship, such that the call repetition can be used to determine whether to update privacy settings for the given subscriber, or the magnitude by which the privacy settings of the given subscriber are to be updated. In another example, calls originated by the given subscriber may be more socially relevant than calls received by the given subscriber from other ATs (e.g., which can potentially be wrong numbers, telemarketers, etc.). In this case, the identity of the call originator can be used to determine whether to update privacy settings for the given subscriber, or the magnitude by which the privacy settings of the given subscriber are to be updated.

Further, there are a number of different ways that the privacy settings for the given subscriber can be updated or modified. For example, the application server 170 may transition the one or more ATs (or their respective users) from 'business contacts' to 'trusted business contacts'. In another example, a social rank associated with the one or more other ATs (or their respective users) may be modified to reflect a closer social relationship (e.g., from '2' to '3' or some other metric adjustment). In another example, it is possible that the users of the one or more ATs were not previously social contacts of the given subscriber with respect to at least one of the given subscriber's registered social networking services, in which case the users of the one or more ATs can be added as social contacts of the given subscriber to these social networking services. While not illustrated explicitly in FIG. 6A, the privacy settings of the users of the one or more ATs can also be updated by the application server 170, at least, if the users of the one or more ATs have registered with the social networking server 180 for social networking service(s) and have permitted the application server 170 to dynamically manage their respective privacy settings.

Accordingly, the application server 170 adjusts the privacy settings for the given subscriber in 620A. The application server 170 can also, if necessary, notify the social networking server 180 with regard to the privacy settings adjustment in 620A (e.g., as in 535A of FIG. 5A). The social networking server 180 then begins interacting with the subscriber's AT based on the adjusted configuration of the privacy settings, 625A (e.g., as in 540A of FIG. 5A). For example, due to the modified privacy settings, more of the given subscriber's information that is managed by the social networking server 180 may be permitted to be viewed by the users of the one or more other ATs, and likewise more information associated with the users of the one or more other ATs may be brought to the attention of the given subscriber.

Figure 6B:
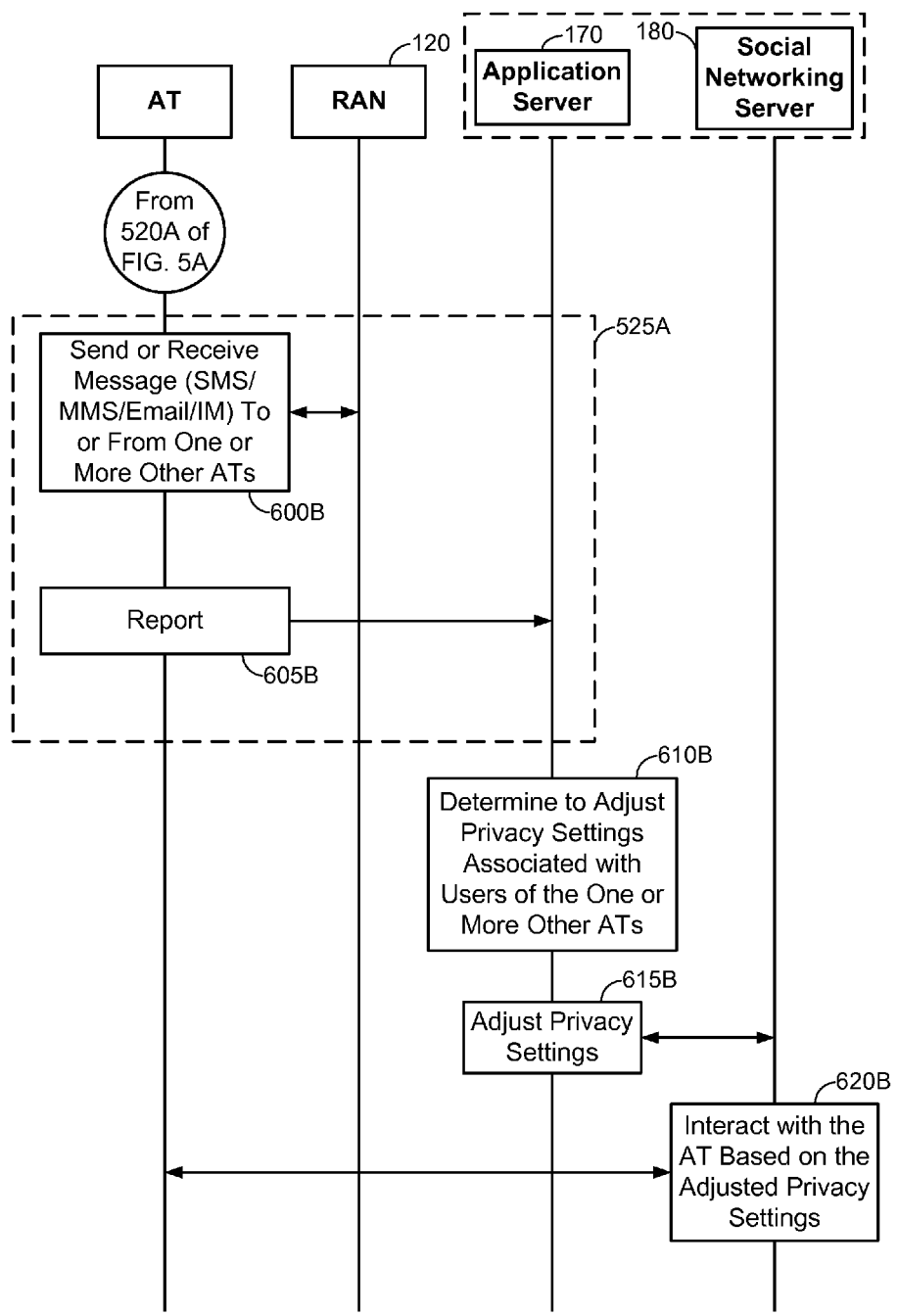

Referring to FIG. 6B, assume that 500A through 520A of FIG. 5A are performed such that a given AT operated by a given subscriber is registered with one or more social networking services hosted by social networking server 180 and has authorized the application server 170 to manage his/her privacy settings for the one or more social networking services. After 520A of FIG. 5A, the process advances to 600B of FIG. 6B, whereby the given AT exchanges a message (e.g., an IM, Email, SMS message, MMS message, etc.) with one or more other ATs, 600B. In an example, the message of 600B can be sent by the one or more other ATs to the given AT, or alternatively can be sent by the given AT to the one or more other ATs.

The given AT sends a message-information report to the application server 170, 605B. For example, the message-information report of 605B can notify the application server 170 that a message was exchanged between the given AT and the one or more other ATs, and can also indicate message-specific information associated with the message. For example, the message-specific information can include the content of the message ("I love you" may indicate a close social relationship, "Thanks for your hard work" may indicate a close business relationship, etc.), type of the message (e.g., Email, IM, SMS message, MMS message, etc.), the time at which the message was sent, the size of the message (e.g., 25 words, 500 words, etc.) and so on. In the embodiment of FIG. 6B, 600B through 605B collectively correspond to the monitoring of the given subscriber's passive behavior of 525A of FIG. 5A, such that the passive behavior being monitored in FIG. 6B includes messages exchanged by the given subscriber via the given AT.

In 610B, the application server 170 evaluates the monitored passive behavior of the subscriber (i.e., the subscriber's exchanged messages from 600B) and determines to adjust or update the current configuration of privacy settings for the subscriber (e.g., similar to 530A of FIG. 5A). For example, the existence of the message exchanged between the given AT and the one or more other ATs may be an indicator of trust or a close social relationship between the respective message participants which may prompt the application server 170 to determine to relax the privacy settings or firewalls between the given subscriber and the users of the one or more other ATs. In another example, the message-specific information associated with the message can be taken into account by the application server 170 in addition to the mere recognition of the message's existence. For example, IMs may be used to infer a closer social relationship as opposed to more 'formal' types of message-types (e.g., Emails), such that the message-type can be used to determine whether to update privacy settings for the given subscriber, or the magnitude by which the privacy settings of the given subscriber are to be updated. In another example, message repetition (e.g., 5 messages per day, 8 messages per week, etc.) can indicate a close social relationship, such that the message repetition can be used to determine whether to update privacy settings for the given subscriber, or the magnitude by which the privacy settings of the given subscriber are to be updated. In another example, messages originated by the given subscriber may be more socially relevant than messages received by the given subscriber from other ATs (e.g., which can potentially be spam, a wrong address or number, etc.). In this case, the identity of the message originator can be used to determine whether to update privacy settings for the given subscriber, or the magnitude by which the privacy settings of the given subscriber are to be updated.

Further, there are a number of different ways that the privacy settings for the given subscriber can be updated or modified. For example, the application server 170 may transition the one or more ATs (or their respective users) from 'business contacts' to 'trusted business contacts'. In another example, a social rank associated with the one or more other ATs (or their respective users) may be modified to reflect a closer social relationship (e.g., from '2' to '3' or some other metric adjustment). In another example, it is possible that the users of the one or more ATs were not previously social contacts of the given subscriber with respect to at least one of the given subscriber's registered social networking services, in which case the users of the one or more ATs can be added as social contacts of the given subscriber to these social networking services. While not illustrated explicitly in FIG. 6B, the privacy settings of the users of the one or more ATs can also be updated by the application server 170, at least, if the users of the one or more ATs have registered with the social networking server 180 for social networking service(s) and have permitted the application server 170 to dynamically manage their respective privacy settings.

Accordingly, the application server 170 adjusts the privacy settings for the given subscriber in 615B. The application server 170 can also, if necessary, notify the social networking server 180 with regard to the privacy settings adjustment in 615B (e.g., as in 535A of FIG. 5A). The social networking server 180 then begins interacting with the subscriber's AT based on the adjusted configuration of the privacy settings, 620B (e.g., as in 540A of FIG. 5A). For example, due to the modified privacy settings, more of the given subscriber's information that is managed by the social networking server 180 may be permitted to be viewed by the users of the one or more other ATs, and likewise more information associated with the users of the one or more other ATs may be brought to the attention of the given subscriber.

Figure 6C:
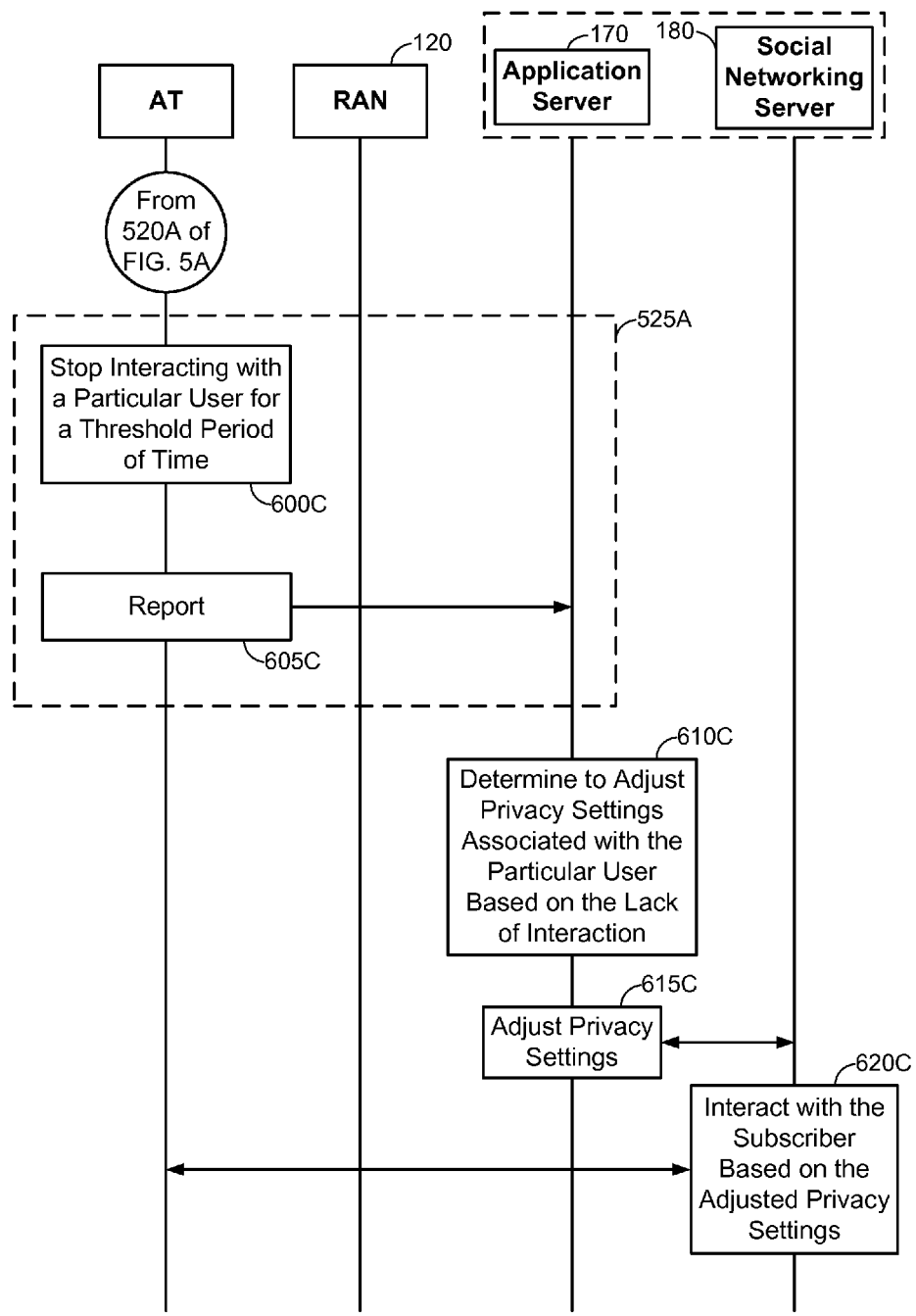

Referring to FIG. 6C, assume that 500A through 520A of FIG. 5A are performed such that a given AT operated by a given subscriber is registered with one or more social networking services hosted by social networking server 180 and has authorized the application server 170 to manage his/her privacy settings for the one or more social networking services. After 520A of FIG. 5A, the process advances to 600C of FIG. 6C, whereby the given AT stops interacting with a particular user for a threshold period of time, 600C. In an example, the interaction cessation of 600C can correspond to an absence of the given subscriber or the particular user to exchange messages (e.g., SMS or MMS messages, Emails, IMs, etc.) and/or call each other for the threshold period of time. The interaction cessation between the given subscriber and the particular user is reported to the application server 170 in 605C. In an example, the report of 605C can be explicit in the sense that the given AT reports that the given subscriber has not communicated with the particular user for the threshold period of time. In another example, the report of 605C can be implicit or inferred by the application server 170 based on a lack of reports indicative of communication between the given subscriber and the particular for the threshold period of time (e.g., in this case, no actual report is sent indicating interaction cessation and instead the given AT's general activity reports are simply monitored at the application server 170). Further, the interaction cessation can be bilateral whereby neither the given subscriber nor the particular user attempts communication with the other party. Alternatively the interaction cessation can be unilateral whereby one of the given subscriber and the particular user attempts contact with the other party, but this communication is either unsuccessful or ignored (e.g., SMS messages are not checked or responded to, call attempts are not accepted, etc.).

In 610C, the application server 170 evaluates the monitored passive behavior of the subscriber (i.e., the subscriber's interaction cessation with the particular user from 600C) and determines to adjust or update the current configuration of privacy settings for the subscriber (e.g., similar to 530A of FIG. 5A). For example, the lack of communication between the given subscriber and the particular user may indicate that that the two parties are socially 'further apart' (e.g., there has been a 'falling out' between the two parties, etc.), which may prompt the application server 170 to determine to heighten the privacy settings or firewalls between the given subscriber and the users of the one or more other ATs. If the interaction cessation is unilateral, it will be appreciated that the privacy settings can be adjusted in a different manner than if the interaction cessation were bilateral. For example, if the particular user is ignoring the given subscriber's attempts to contact him/her, the given subscriber appears to want to contact the particular user so that the privacy settings need not be heightened significantly (if at all). In another example, if the given subscriber is ignoring the particular user's attempts to contact him/her (e.g., the particular user is a stalker, etc.), the given subscriber appears to want to avoid contact with the particular user so that the privacy settings can be heightened significantly.

Further, there are a number of different ways that the privacy settings for the given subscriber can be updated or modified. For example, the application server 170 may transition the one or more ATs (or their respective users) from 'trusted business contacts' to 'business contacts'. In another example, a social rank associated with the one or more other ATs (or their respective users) may be modified to reflect a more distant social relationship (e.g., from '3' to '2' or some other metric adjustment). In another example, it is possible that the users of the one or more ATs were not previously social contacts of the given subscriber with respect to at least one of the given subscriber's registered social networking services, in which case the particular user can be blocked from contacting the given subscriber. While not illustrated explicitly in FIG. 6C, the privacy settings of the users of the one or more ATs can also be updated by the application server 170, at least, if the users of the one or more ATs have registered with the social networking server 180 for social networking service(s) and have permitted the application server 170 to dynamically manage their respective privacy settings.

Accordingly, the application server 170 adjusts the privacy settings for the given subscriber in 615C. The application server 170 can also, if necessary, notify the social networking server 180 with regard to the privacy settings adjustment in 615C (e.g., as in 535A of FIG. 5A). The social networking server 180 then begins interacting with the subscriber's AT based on the adjusted configuration of the privacy settings, 620C (e.g., as in 540A of FIG. 5A). For example, due to the modified privacy settings, less of the given subscriber's information that is managed by the social networking server 180 may be permitted to be viewed by the users of the one or more other ATs, and likewise less information associated with the users of the one or more other ATs may be brought to the attention of the given subscriber.

Figure 6D:
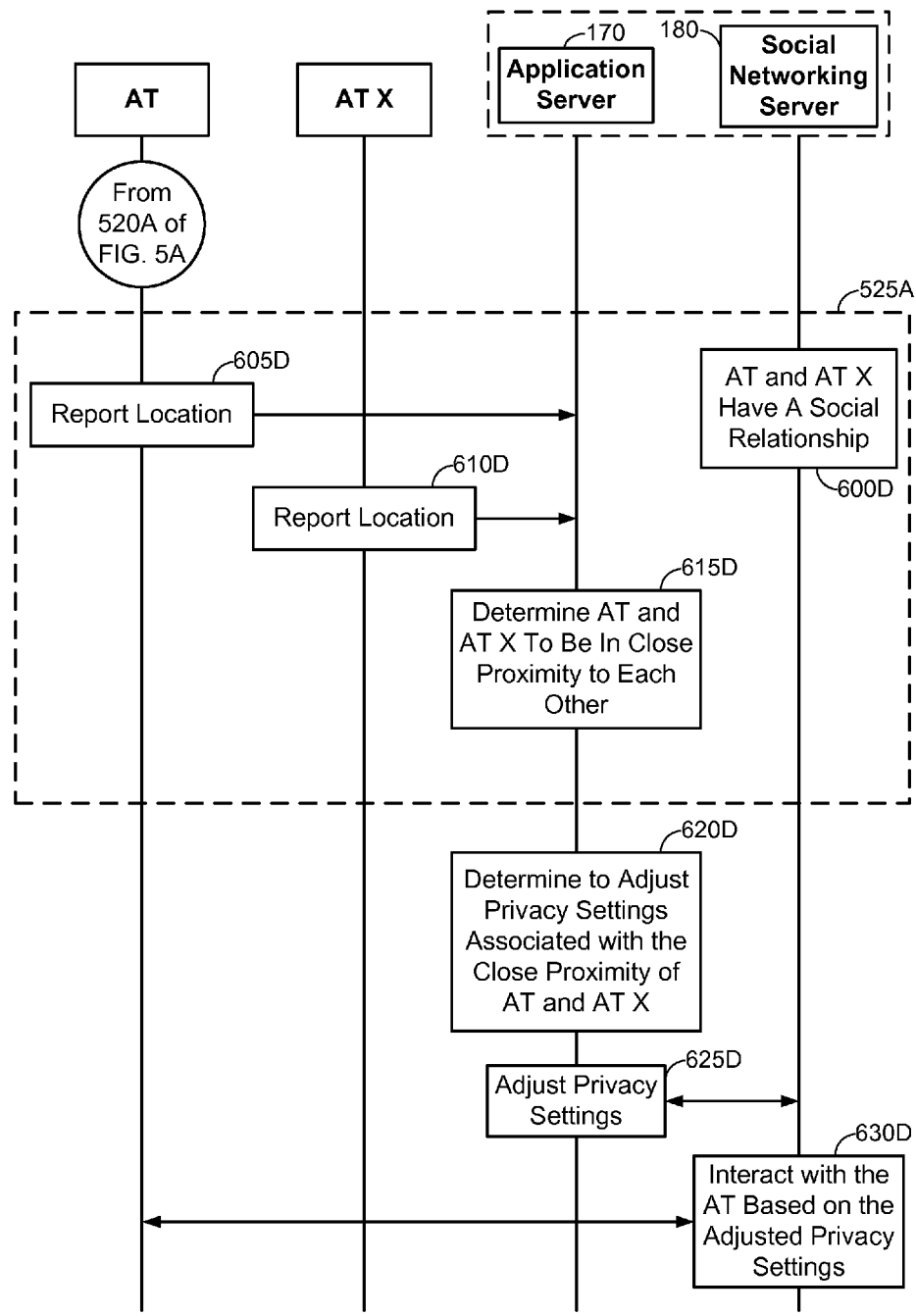

Referring to FIG. 6D, assume that 500A through 520A of FIG. 5A are performed such that a given AT operated by a given subscriber is registered with one or more social networking services hosted by social networking server 180 and has authorized the application server 170 to manage his/her privacy settings for the one or more social networking services. After 520A of FIG. 5A, the process advances to 600D of FIG. 6D, whereby it is assumed that the given subscriber and a user of another AT ("AT X") have a pre-established social relationship with the one or more social networking services hosted by the social networking server 180. Next, the given AT and AT X each report their respective locations to the application server 170, 605D and 610D. In an example, the reports of 605D and 610D can be conveyed directly from the given AT and AT X to the application server 170. Alternatively, the location-reports can be conveyed to the social networking server 180, which in turn conveys the location-reports to the application server 170 (e.g., in response to a query by the application server 170, etc.). In an example, the reported locations of the given AT and/or AT X can correspond to geographic coordinates (e.g., latitude and longitude based on GPS, etc.), a serving area of the respective ATs (e.g., a sector, subnet, etc.) and/or a 'place' (e.g., a shopping mall, movie theater, street intersection, etc.).

In the embodiment of FIG. 6D, assume that the given AT and AT X are relatively close to each other. Thus, based on the location-reports of 605D and 610D, the application server 170 determines that the given AT and AT X are in close proximity to each other in 615D. In the embodiment of FIG. 6D, 600D through 615D collectively correspond to the monitoring of the given subscriber's passive behavior of 525A of FIG. 5A, such that the passive behavior being monitored in FIG. 6D includes the location of the given AT with respect to location(s) of one or more of the given subscriber's social contacts.

In 620D, the application server 170 evaluates the monitored passive behavior of the subscriber (i.e., the subscriber's relative location to AT X) and determines to adjust or update the current configuration of privacy settings for the subscriber (e.g., similar to 530A of FIG. 5A). For example, the given AT and AT X being physically close to each other may be an indicator of a closer social relationship due to the possibility of 'meeting up', potential shared interests (e.g., if the given AT and AT X are at the same bookstore or concert venue) and so on. Thus, the close physical proximity of the given AT to AT X may prompt the application server 170 to determine to relax the privacy settings or firewalls between the given subscriber and the user of AT X.

Further, there are a number of different ways that the privacy settings for the given subscriber can be updated or modified. For example, the application server 170 may transition the user of AT X from a 'business contact' to a 'trusted business contacts. In another example, a social rank associated with the user of AT may be modified to reflect a closer social relationship (e.g., from '2' to '3' or some other metric adjustment). While not illustrated explicitly in FIG. 6D, the privacy settings of the user of AT X can also be updated by the application server 170, at least, if the user of AT X registered with the social networking server 180 for social networking service(s) and has permitted the application server 170 to dynamically manage his/her respective privacy settings.

Accordingly, the application server 170 adjusts the privacy settings for the given subscriber in 625D. The application server 170 can also, if necessary, notify the social networking server 180 with regard to the privacy settings adjustment in 625D (e.g., as in 535A of FIG. 5A). The social networking server 180 then begins interacting with the subscriber's AT based on the adjusted configuration of the privacy settings, 630D (e.g., as in 540A of FIG. 5A). For example, due to the modified privacy settings, more of the given subscriber's information that is managed by the social networking server 180 may be permitted to be viewed by the user of AT X, and likewise more information associated with the user of AT X may be brought to the attention of the given subscriber.

Figure 7A:
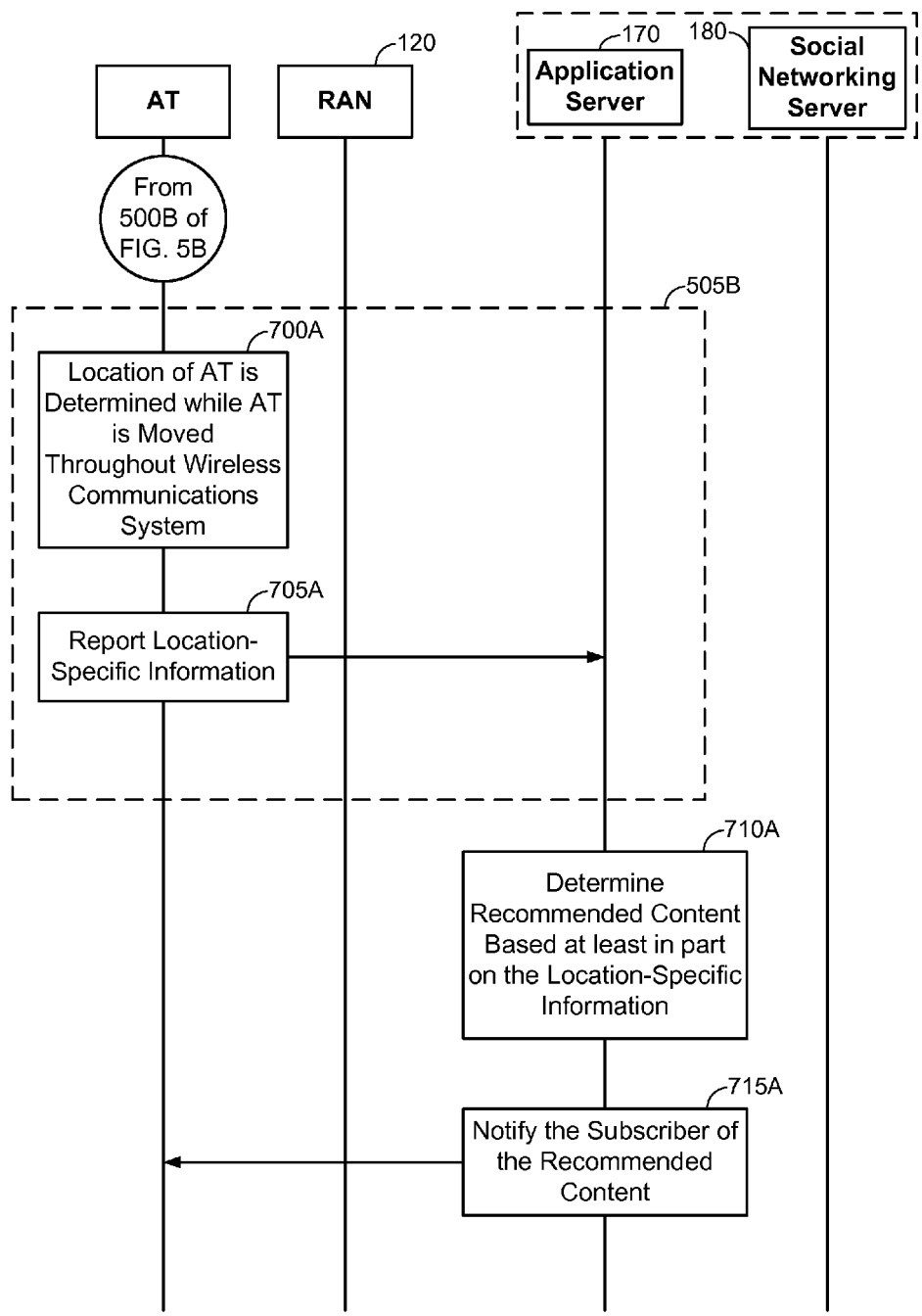
FIGS. 7A through 7E each illustrate an implementation example of FIG. 5B in accordance with embodiments of the invention.

Referring to FIG. 7A, assume that 500B of FIG. 5B is performed such that a given AT operated by a given subscriber accesses and begins some type of interaction with a social networking service (e.g., Facebook, Twitter, MySpace, etc.). After 500B of FIG. 5B, the process advances to 700A of FIG. 7A, whereby the given AT is carried by the given subscriber and the given AT monitors its location as the given subscriber moves throughout the wireless communications system, 700A. Here, the given subscriber's usage of the given AT can be said to be 'passive' in the sense that the given AT is monitoring its location even when the given subscriber is not directly interacting with the given AT. At some later point in time, in 705A, the given AT sends one or more reports to the application server 170 that convey location-specific information based on the location-monitoring from 700A. In an example, the location-specific information can convey 'place'-type information (e.g., physical sites that the given AT has traveled to or been near, such as bookstores, movie theaters, etc.), serving area information (e.g., sectors that have served the given AT, etc.) or geographic coordinates of the given AT. In the embodiment of FIGS. 7A, 700A and 705A collectively correspond to the monitoring of the given subscriber's passive behavior of 505B of FIG. 5B, such that the passive behavior being monitored in FIG. 7A includes the location(s) of the given AT during operation by the given subscriber.

In 710A, the application server 170 evaluates the monitored passive behavior of the subscriber (e.g., the locations at which the given AT has traveled) to determine recommended content to be sent to the subscriber's AT, 710A (e.g., as in 510B of FIG. 5B). After determining the content to recommend to the subscriber, the application server 170 sends a notification of the recommended content to the given AT for presentation to the given subscriber, 715A (e.g., as in 515B of FIG. 5B).

In an example, blocks 710A and 715A of FIG. 7A can be performed exclusively by the application server 170. In an alternative embodiment, the social networking server 180 may interact with the application server 170 to determine the content to be recommended to the given subscriber. For example, the social networking server 180 may store the actual content to be recommended to the given subscriber. In this case, the application server 170 and the social networking server 180 can coordinate to search for the recommended content and provision the recommended content to the given AT based on the monitored passive behavior of the given subscriber.

Figure 7B:
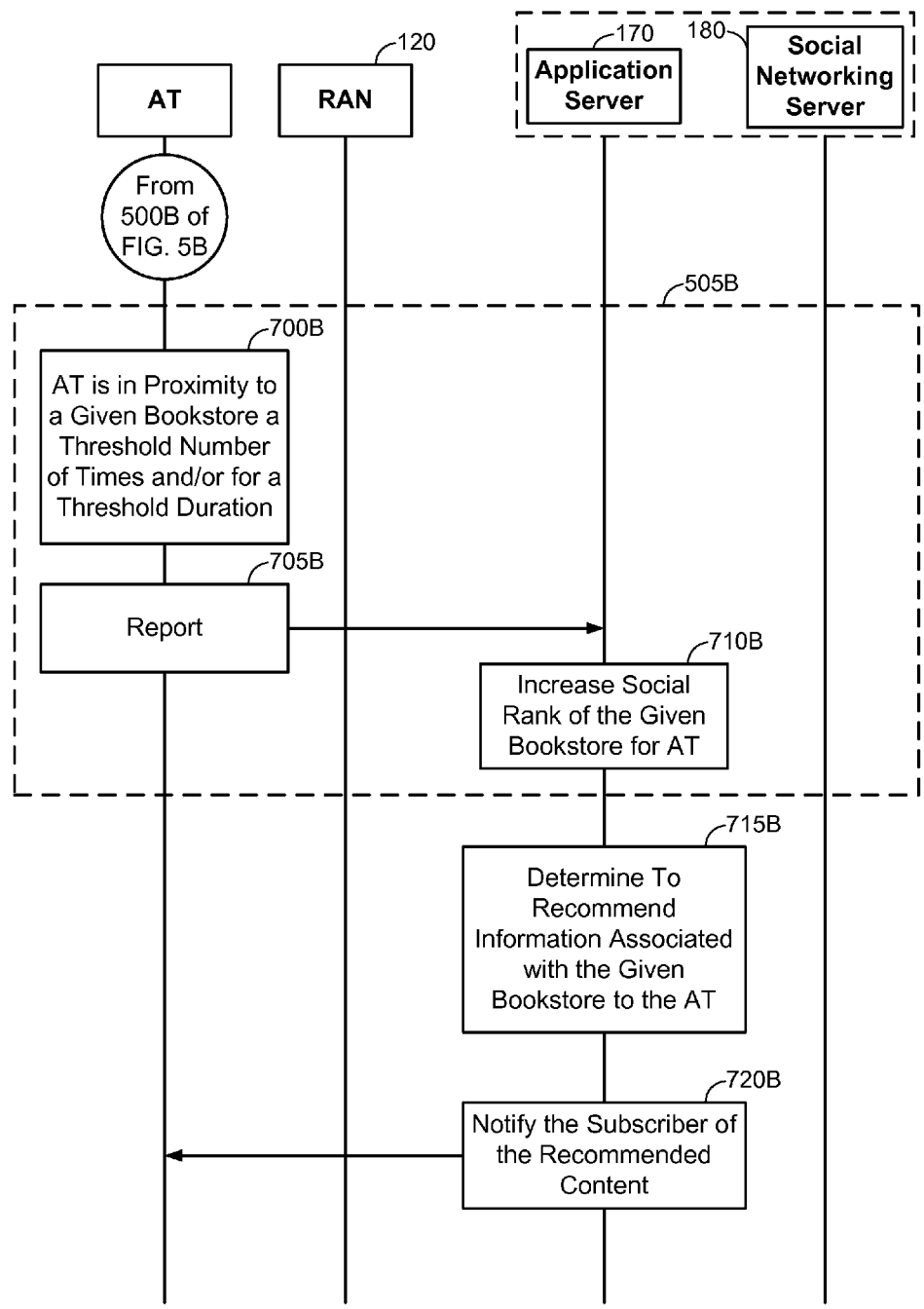

FIG. 7B illustrates a more detailed implementation of the process of FIG. 7A whereby the location-specific information reported by the given AT notifies the application server 170 of the given subscriber's proximity to a bookstore (i.e., a 'place').

Referring to FIG. 7B, assume that 500B of FIG. 5B is performed such that a given AT operated by a given subscriber accesses and begins some type of interaction with a social networking service (e.g., Facebook, Twitter, MySpace, etc.). After 500B of FIG. 5B, the process advances to 700B of FIG. 7B, whereby the given AT is carried by the given subscriber in proximity to a given bookstore a threshold number of times (or visits) and/or for a threshold duration. In an example, the given AT itself can determine whether to send location reports to the application server 170 based on its own determination regarding the number of times the given subscriber has visited the given bookstore and/or for the duration of the given subscriber's stay at the given bookstore. Alternatively, the given AT can simply report its location to the application server 170 on a periodic basis and rely upon the application server 170 to determine the implications of the given subscriber's bookstore interest from the location reports. In any case, the given AT sends one or more location reports to the application server 170 in 705B from which the application server 170 concludes that the given subscriber has a particular interest in, or association with, the given bookstore. The application server 170 thereby increases a social rank (or relevance metric) of the given bookstore for the given subscriber, 710B. In the embodiment of FIG. 7B, 700B through 710B collectively correspond to the monitoring of the given subscriber's passive behavior of 505B of FIG. 5B, such that the passive behavior being monitored in FIG. 7B includes the given subscriber's proximity to the given bookstore.

In 715B, the application server 170 evaluates the monitored passive behavior of the subscriber (e.g., the given bookstore's proximity to the given AT) to determine recommended content to be sent to the subscriber's AT (e.g., as in 510B of FIG. 5B). For example, the application server 170 may determine to advertise coupons or upcoming book releases at the given bookstore to the given subscriber in 715B. In another example, the application server 170 may determine to advertise businesses associated with the given bookstore in 715B. In another example, the given subscriber's relationship to the given bookstore may be that the given bookstore is along the daily commute of the given subscriber to his/her workplace. In this case, the application server 170 can determine to notify the given subscriber of the given bookstore's location in case the given subscriber was unaware of the given bookstore's location. After determining the content to recommend to the subscriber, the application server 170 sends a notification of the recommended content to the given AT for presentation to the given subscriber, 720B (e.g., as in 515B of FIG. 5B). In 720B, the application server 170 can send an SMS message to the given AT that notifies the given subscriber of the given bookstore's location and/or special deals currently available at the given bookstore, for instance.

Figure 7C:
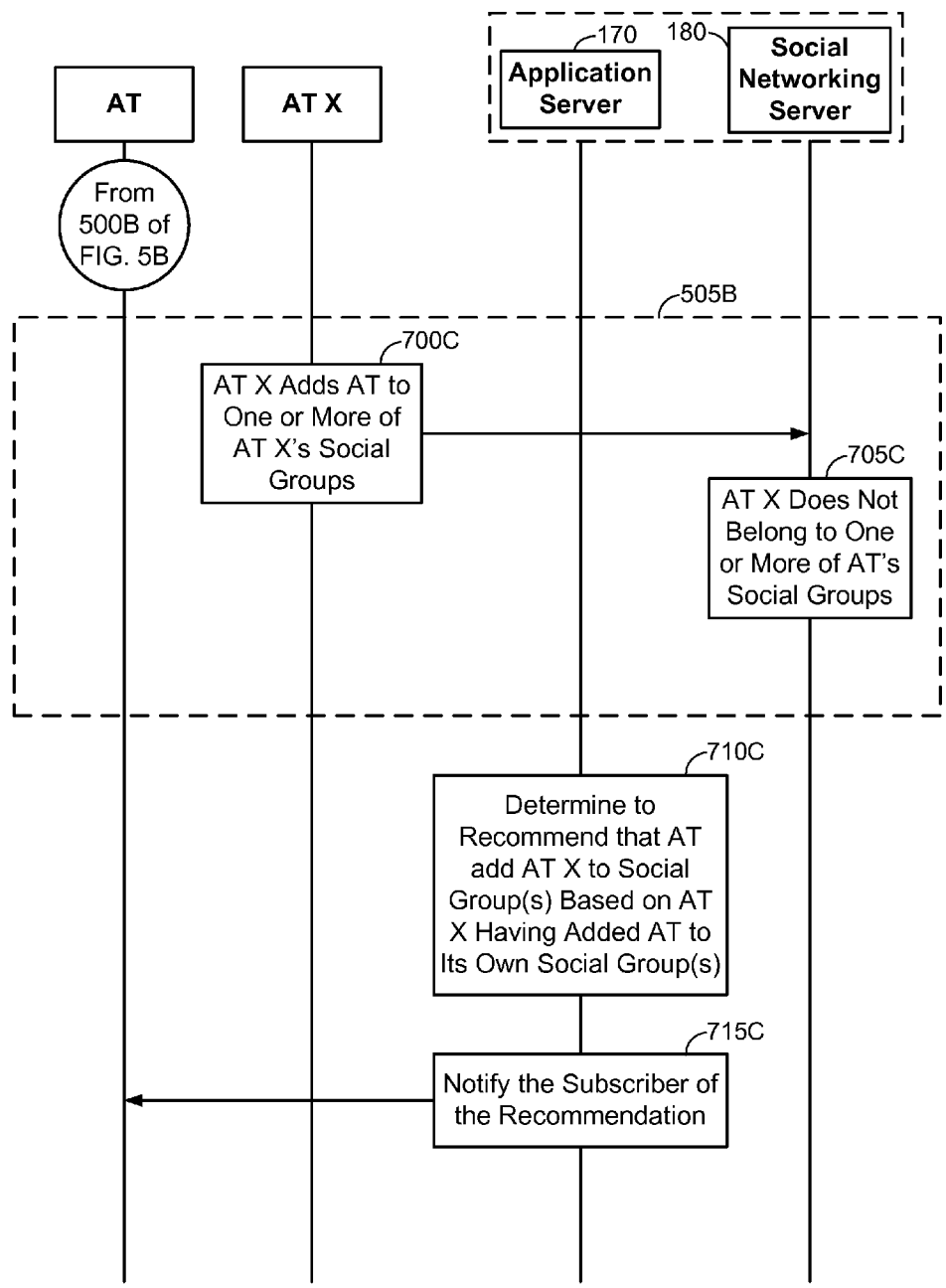

Referring to FIG. 7C, assume that 500B of FIG. 5B is performed such that a given AT operated by a given subscriber accesses and begins some type of interaction with a social networking service (e.g., Facebook, Twitter, MySpace, etc.). After 500B of FIG. 5B, the process advances to 700C of FIG. 7C, whereby a user of another AT ("AT X") that also subscribes to the social networking service adds the given subscriber to a social group of the user of AT X in association with the social networking service. At this point, assume that the user of AT X does not yet belong to any of the given subscriber's social groups with the social networking service, 705C.

In 710C, the application server 170 evaluates the monitored passive behavior of the subscriber (e.g., the given subscriber does not reciprocate a group-add action when another user adds the given subscriber to his/her own social group) to determine that the given subscriber be recommended to add the user of AT X to one or more social groups of the given subscriber. For example, assume that the given subscriber and the user of AT X, prior to the process of FIG. 7C, are ungrouped social contacts of each other. Next, in 700C, the user of AT X categorizes the given subscriber as a business contact. In this scenario, it is likely that the given subscriber would also consider the user of AT X to be a business contact. Thus, the application server 170 determines to recommend that the given subscriber add the user of AT X to his/her business contact list (or social group) in 710C. After determining the content to recommend to the subscriber (i.e., the group-add or categorization recommendation of the user of AT X for the given subscriber), the application server 170 sends a notification of the recommended content to the given AT for presentation to the given subscriber, 715C (e.g., as in 515B of FIG. 5B).

Figure 7D:
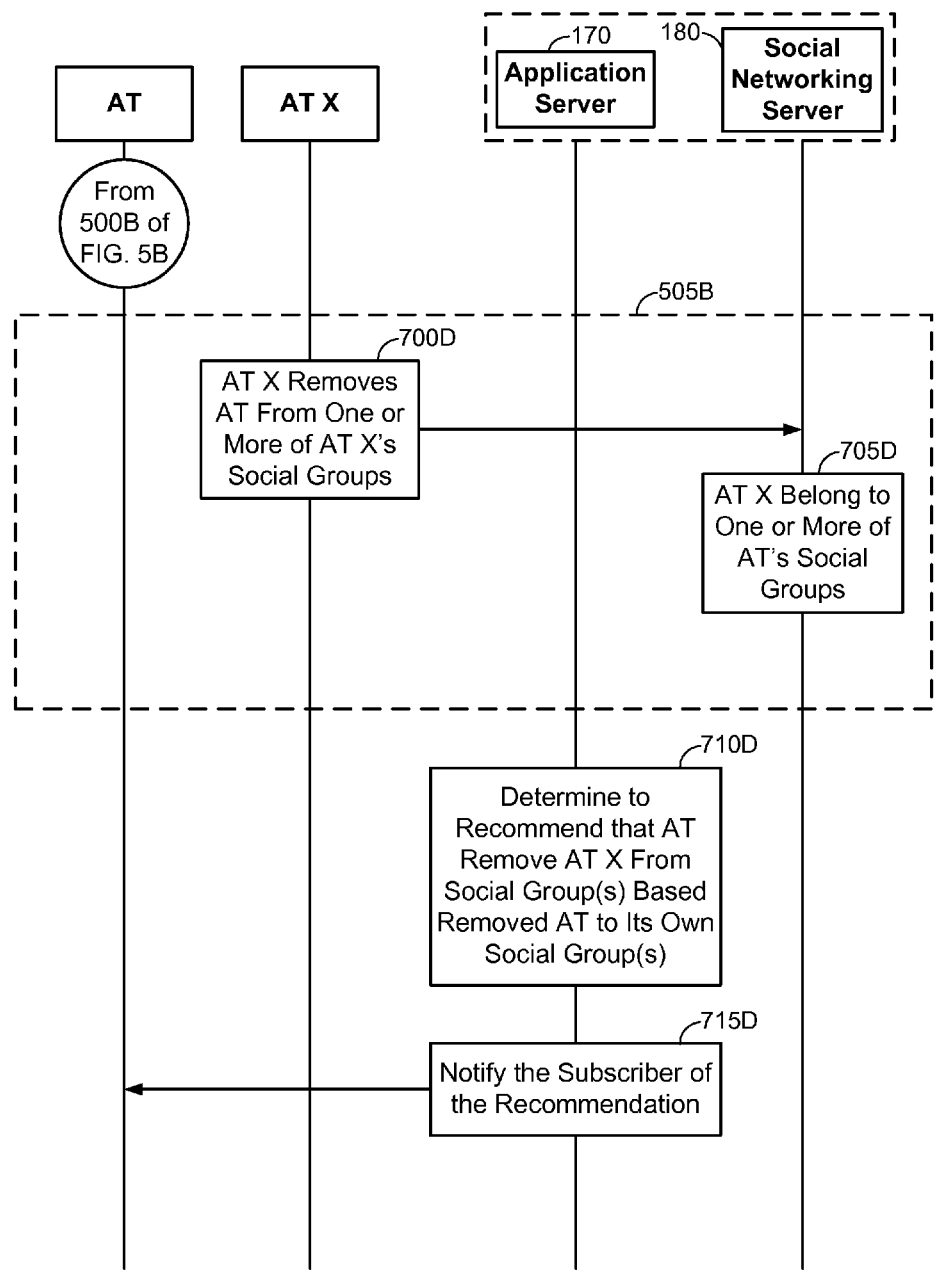

Referring to FIG. 7D, assume that 500B of FIG. 5B is performed such that a given AT operated by a given subscriber accesses and begins some type of interaction with a social networking service (e.g., Facebook, Twitter, MySpace, etc.). After 500B of FIG. 5B, the process advances to 700D of FIG. 7D, whereby a user of another AT ("AT X") that also subscribes to the social networking service removes the given subscriber from a social group of the user of AT X in association with the social networking service. For example, the user of AT X may be a previous client of the given subscriber who is very dissatisfied with the given subscriber's work, such that the user of AT X removes the given subscriber from his/her business contact group. Alternatively, the user of AT X may be an ex-spouse of the given subscriber, such that the user of AT X removes the given subscriber from his/her family contact group. At this point, assume that the user of AT X belongs to a similar social group of the given subscriber in association with the same social networking service, 705D.

In 710D, the application server 170 evaluates the monitored passive behavior of the subscriber (e.g., the given subscriber has not yet reciprocated a group-remove action when another user removes the given subscriber from his/her own social group) to determine that the given subscriber be recommended to remove the user of AT X from one or more social groups of the given subscriber, and then notifies the subscriber of the recommendation, 715D.

For example, referring to FIG. 7D, assume that the given subscriber and the user of AT X, prior to the process of FIG. 7D, are mutually grouped social contacts of each other. Next, in 700D, the user of AT X de-categorizes the given subscriber as a family contact, implying that the given subscriber is no longer considered to be a family member of the user of AT X. In this scenario, it is likely that the given subscriber would also no longer consider the user of AT X to be a family contact (or at least, would probably want to know about his/her disassociation by the user of AT X). Thus, the application server 170 determines to recommend that the given subscriber remove the user of AT X from his/her family contact list (or social group) in 710D. After determining the content to recommend to the subscriber (i.e., the group-remove or de-categorization recommendation of the user of AT X for the user of given subscriber), the application server 170 sends a notification of the recommended content to the given AT for presentation to the given subscriber, 715D (e.g., as in 515B of FIG. 5B).

Figure 7E:
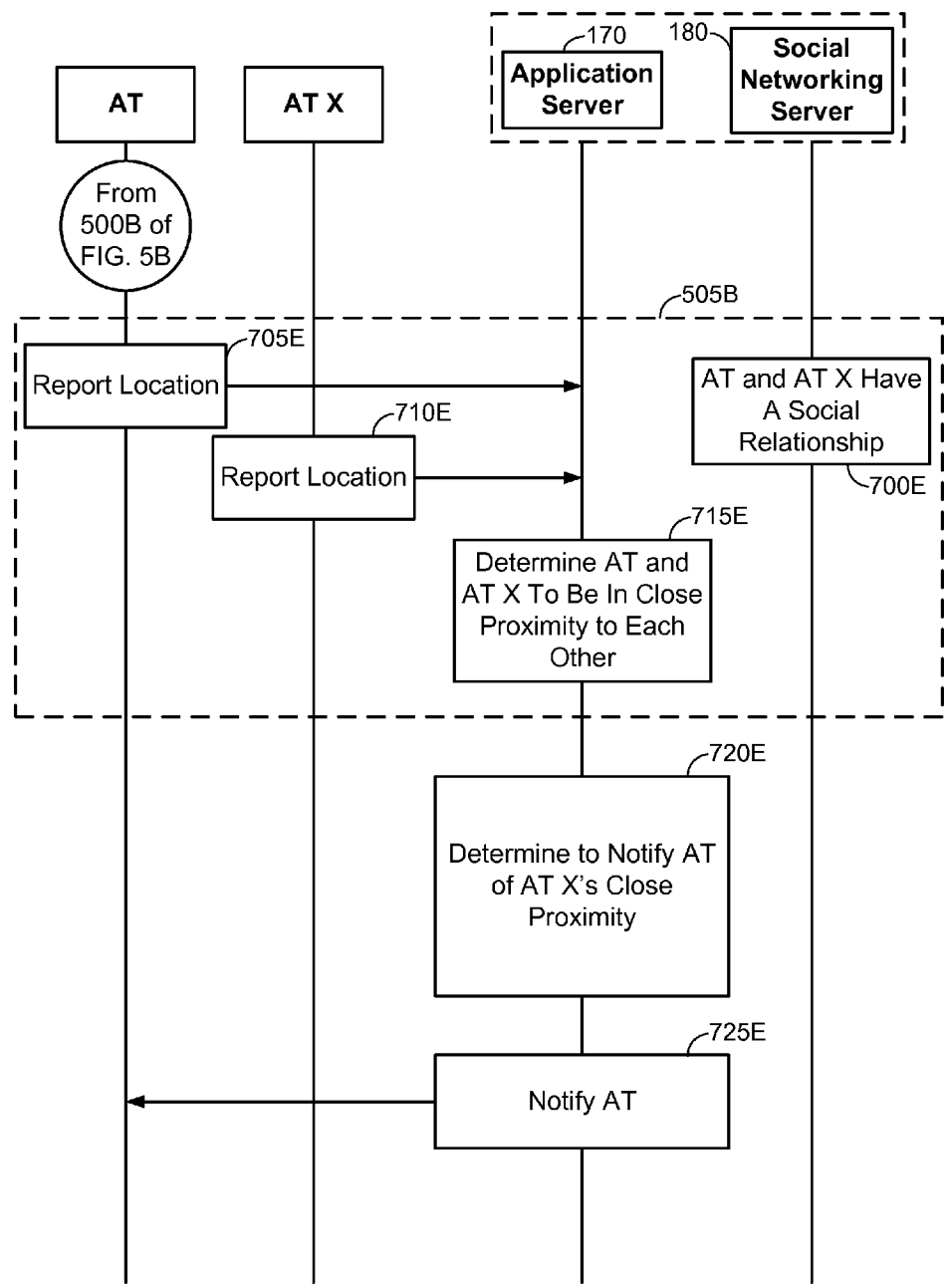

Referring to FIG. 7E, assume that 500B of FIG. 5B is performed such that a given AT operated by a given subscriber accesses and begins some type of interaction with a social networking service (e.g., Facebook, Twitter, MySpace, etc.). After 500B of FIG. 5B, the process advances to 700E of FIG. 7E. Next, assume that 700E through 715E of FIG. 7E correspond to 600D through 615D of FIG. 6D, respectively. Thus, after 715E of FIG. 7E, the application server 170 is aware that the given AT and AT X are in close proximity to each other.

In 720E, the application server 170 evaluates the monitored passive behavior of the subscriber (e.g., the close physical proximity of the given AT and AT X) to determine that the given subscriber be notified of the location of AT X. It will be appreciated that this notification implicitly functions as a recommendation that the given subscriber, in his/her discretion, contact the user of AT X. After determining the content to recommend to the subscriber (i.e., AT X's local-availability information), the application server 170 sends a notification of the recommended content to the given AT for presentation to the given subscriber, 725E (e.g., as in 515B of FIG. 5B).

Figure 8A:
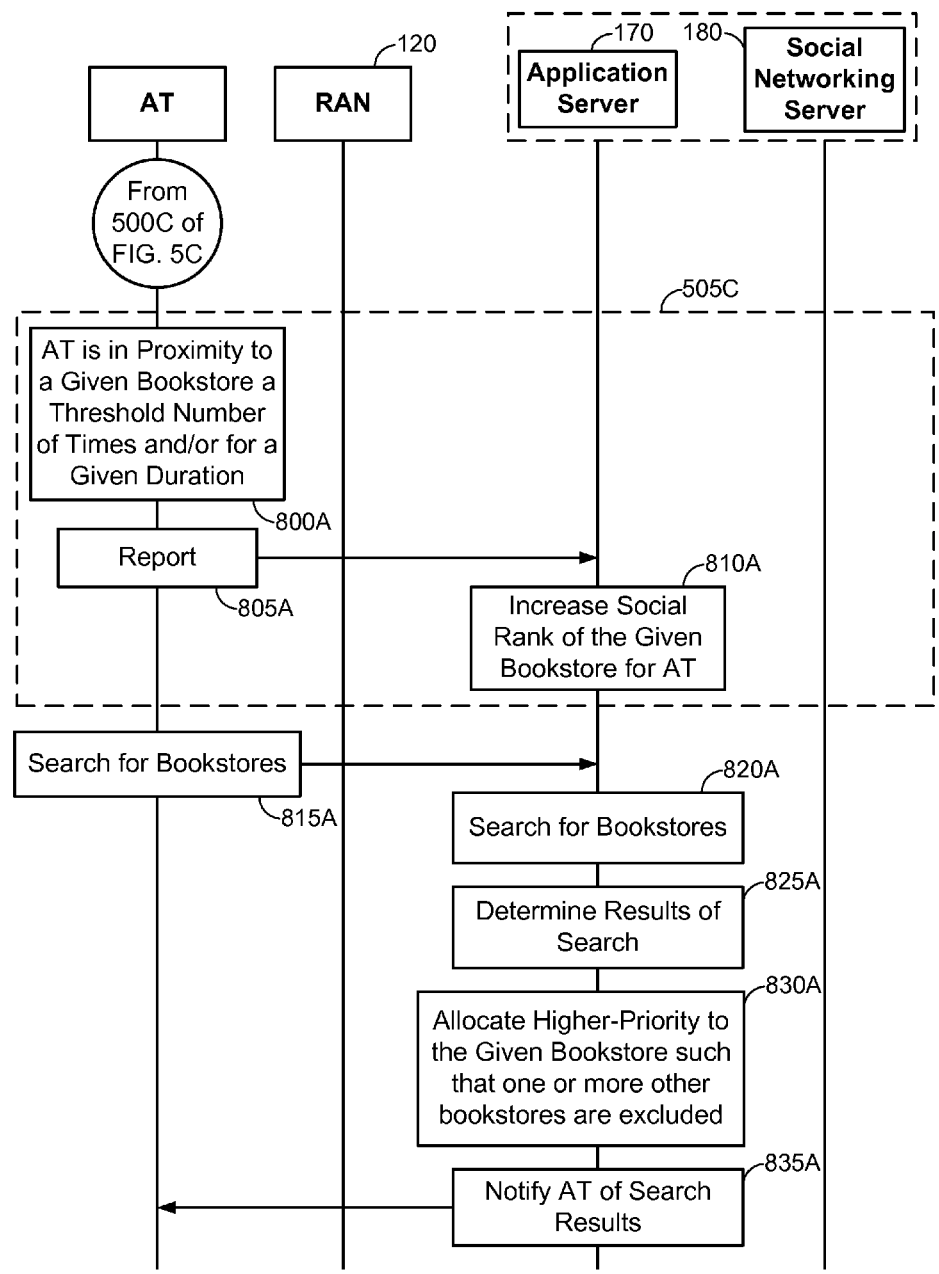
FIGS. 8A through 8D each illustrate an implementation example of FIG. 5C in accordance with embodiments of the invention.

Referring to FIG. 8A, assume that 500C of FIG. 5C is performed such that a given AT operated by a given subscriber accesses and begins some type of interaction with a social networking service (e.g., Facebook, Twitter, MySpace, etc.). After 500C of FIG. 5C, the process advances to 800A of FIG. 8A. Next, assume that 800A through 810A correspond to 700B through 710B of FIG. 7B, respectively. Thus, after 810A of FIG. 8A, the application server 170 is aware that the given AT is associated with, and has recently been close to, the given bookstore such that the social rank or relative importance of the given bookstore for the given subscriber has been augmented.

Next, assume that the given subscriber determines to search for bookstores, such that the given subscriber manually enters bookstore search criteria into the given AT, and the given AT sends the manually entered search criteria to the application server 170 in 815A (e.g., similar to 510C of FIG. 5C). The application server 170 receives the manually entered bookstore search criteria from the given AT and performs searches for bookstores that satisfy the bookstore search criteria, 820A (e.g., as in 515C of FIG. 5C). The application server 170 determines the result of the bookstore search (if any), 825A (e.g., as in 520C of FIG. 5C). After obtaining the search results in 825A, the application server 170 selectively excludes or removes search results based on the passive behavior of the subscriber as monitored by the application server 170, 830A. In the embodiment of FIG. 8A, this means that the given bookstore is prioritized above other bookstores that satisfy the bookstore search criteria due to the given bookstore's known association with the given AT from 810A. As a result, other bookstores are de-prioritized or 'excluded' due to the higher prioritization of the given bookstore.

After selectively excluding search results in 830A, the application server 170 sends any remaining search results to the given AT for presentation to the given subscriber, 835A (e.g., as in 530C of FIG. 5C). As will be appreciated, in the embodiment of FIG. 8A, it is likely that the search results sent to the given AT by the application server 170 in 835A will include an indication of the given bookstore.

Figure 8B:
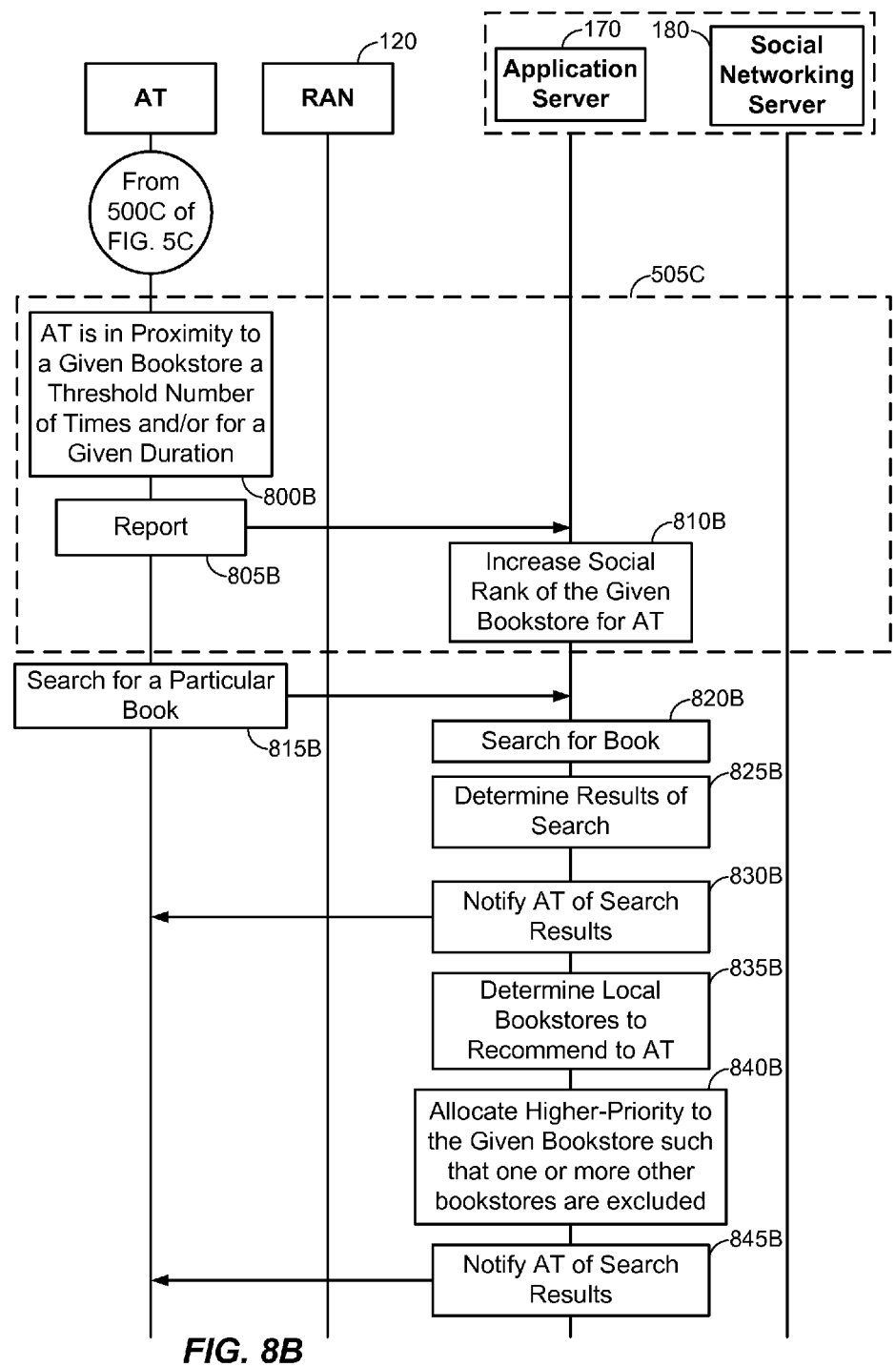

FIG. 8B illustrates a variation of FIG. 8A, whereby the given subscriber searches for a particular book instead of for a particular bookstore. Referring to FIG. 8B, assume that 800B through 810B correspond to 800A through 810A of FIG. 8A, respectively.

Next, assume that the given subscriber determines to search for a particular book of interest, such that the given subscriber manually enters book search criteria into the given AT, and the given AT sends the manually entered search criteria to the application server 170 in 815B (e.g., similar to 510C of FIG. 5C). The application server 170 receives the manually entered book search criteria from the given AT and performs searches for books that satisfy the book search criteria, 820B (e.g., as in 515C of FIG. 5C). The application server 170 determines the result of the book search (if any), 825B (e.g., as in 520C of FIG. 5C), and returns the book search results to the given AT for presentation to the given subscriber, 830B.

In FIG. 8B, the application server 170 can further attempt to determine content for recommendation to the subscriber based on the manually entered book search criteria that is not technically a result of the search, but is still somehow related to the search. In this case, the application server 170 can determine local bookstores that are currently stocking the book of interest to the given subscriber.

Accordingly, the application server 170 searches for local bookstores to recommend to the given subscriber (i.e., bookstores stocking the book of interest) in 835B. After obtaining the search results in 835B, the application server 170 selectively excludes or removes search results based on the passive behavior of the subscriber as monitored by the application server 170, 840B. In the embodiment of FIG. 8B, this means that the given bookstore is prioritized above other bookstores that satisfy the bookstore search criteria due to the given bookstore's known association with the given AT from 810B. As a result, other bookstores are de-prioritized or 'excluded' due to the higher prioritization of the given bookstore.

After selectively excluding search results in 840B, the application server 170 sends any remaining search results to the given AT for presentation to the given subscriber, 845B (e.g., as in 545C of FIG. 5C). As will be appreciated, in the embodiment of FIG. 8B, it is likely that the search results sent to the given AT by the application server 170 in 845B will include an indication of the given bookstore.

Figure 8C:
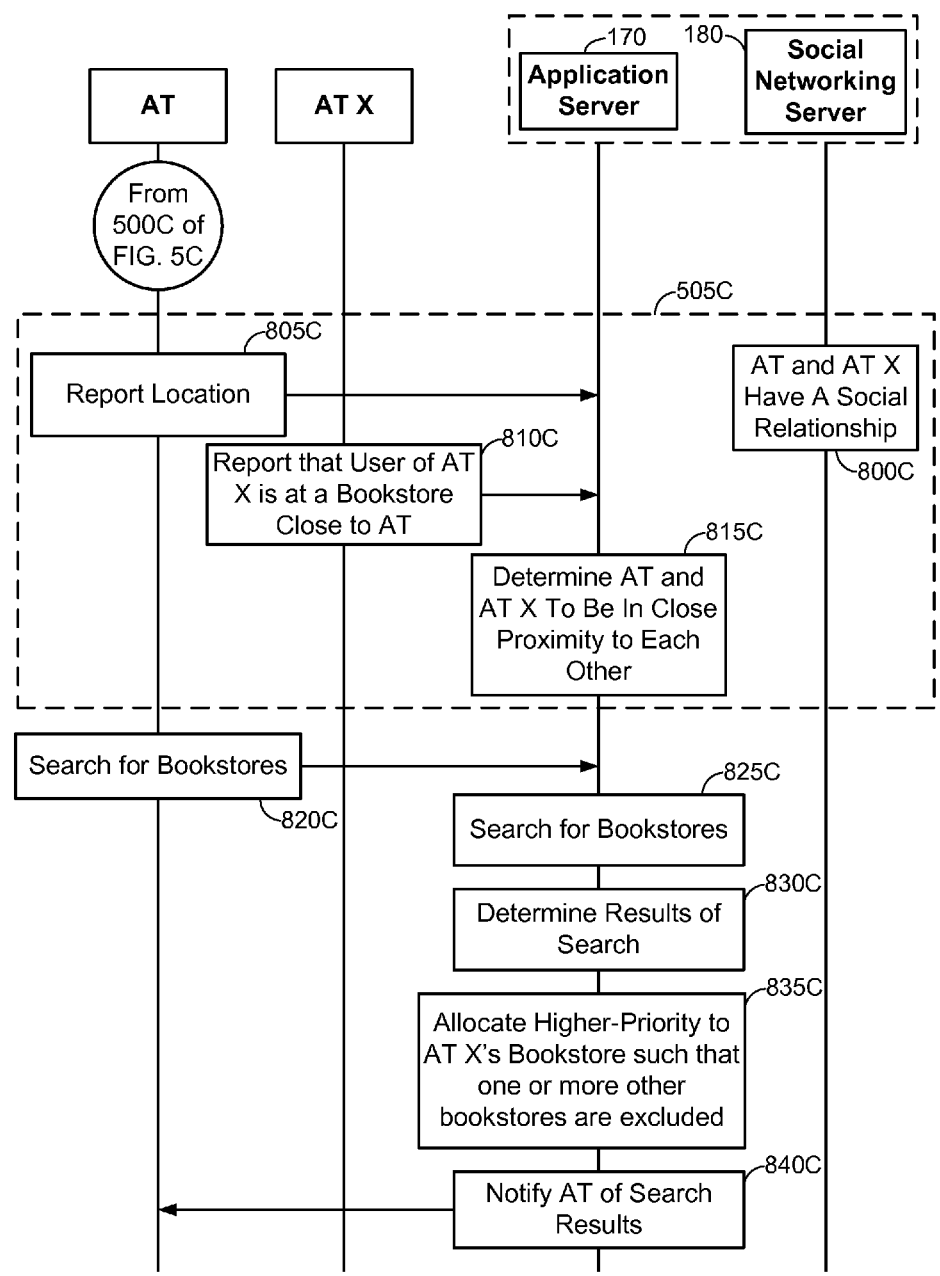

FIG. 8C illustrates an implementation of FIG. 5C that is similar in certain respects to FIG. 8A, except FIG. 8C modifies the priority of the given bookstore based on the given subscriber's proximity to another user (and social contact of the given subscriber) that is at the given bookstore.

Referring to FIG. 8C, assume that 500C of FIG. 5C is performed such that a given AT operated by a given subscriber accesses and begins some type of interaction with a social networking service (e.g., Facebook, Twitter, MySpace, etc.). After 500C of FIG. 5C, the process advances to 800C of FIG. 8C, whereby it is assumed that the given subscriber and a user of another AT ("AT X") have a pre-established social relationship with the one or more social networking services hosted by the social networking server 180. Next, the given AT and AT X each report their respective locations to the application server 170, 805C and 810C. In an example, the reports of 805C and 810C can be conveyed directly from the given AT and AT X to the application server 170. Alternatively, the location-reports can be conveyed to the social networking server 180, which in turn conveys the location-reports to the application server 170 (e.g., in response to a query by the application server 170, etc.).

In the embodiment of FIG. 8C, it may be assumed that the reported location for AT X in 810C includes in an indication that AT X is currently positioned at a particular place, i.e., the given bookstore. Further, in the embodiment of FIG. 8C, assume that the given AT and AT X are relatively close to each other. For example, AT X can be at the given bookstore itself, whereas the given AT can be in the same city as AT X, or a few blocks away from the given bookstore, or in the same or neighboring serving sector as AT X, and so on.

Thus, based on the location-reports of 805C and 810C, the application server 170 determines that the given AT and AT X are in close proximity to each other in 815C. In the embodiment of FIG. 8C, 800C through 815C collectively correspond to the monitoring of the given subscriber's passive behavior of 505C of FIG. 5C, such that the passive behavior being monitored in FIG. 8C includes the location of the given AT with respect to location(s) of one or more of the given subscriber's social contacts. While not shown explicitly in FIG. 8C at block 815C, the application server 170's knowledge that the given AT and AT X are close to each other combined with the knowledge of AT X's association with the given bookstore can cause the application server 170 to augment the social rank or relative importance of the given bookstore for the given subscriber.

Next, assume that the given subscriber determines to search for bookstores, such that the given subscriber manually enters bookstore search criteria into the given AT, and the given AT sends the manually entered search criteria to the application server 170 in 820C (e.g., similar to 510C of FIG. 5C). The application server 170 receives the manually entered bookstore search criteria from the given AT and performs searches for bookstores that satisfy the bookstore search criteria, 825C (e.g., as in 515C of FIG. 5C). The application server 170 determines the result of the bookstore search (if any), 830C (e.g., as in 520C of FIG. 5C). After obtaining the search results in 830C, the application server 170 selectively excludes or removes search results based on the passive behavior of the subscriber as monitored by the application server 170, 835C. In the embodiment of FIG. 8C, this means that the given bookstore is prioritized above other bookstores that satisfy the bookstore search criteria due to the given bookstore's known association with the given AT, which is inferred from (i) the user of AT X being a social contact of the given subscriber, (ii) the close proximity of the given AT with AT X and (iii) AT X's known location of the given bookstore. As a result, other bookstores are de-prioritized or 'excluded' due to the higher prioritization of the given bookstore. In other words, the given subscriber wants to find a bookstore, and the application server 170 is trying to leverage the knowledge that a friend (or other social contact) of the given subscriber is already at a bookstore. Because AT X is already fairly close to the given AT, the application server 170 will attempt to direct the given subscriber to the given bookstore so that, in addition to the given subscriber obtaining his/her desired book, the given subscriber can also meet up with the user of AT X (potentially).

After selectively excluding search results in 835C, the application server 170 sends any remaining search results to the given AT for presentation to the given subscriber, 840C (e.g., as in 530C of FIG. 5C). As will be appreciated, in the embodiment of FIG. 8C, it is likely that the search results sent to the given AT by the application server 170 in 840C will include an indication of the given bookstore. Also, an indication that AT X is at the given bookstore already can also be sent to the given subscriber in 840C. While not shown in FIG. 8C explicitly, AT X can also be notified that the given subscriber is in the general area of AT X and is looking for a bookstore, so that AT X could coordinate with the given AT to arrange a meeting with the given subscriber at the given bookstore, for instance.

Figure 8D:
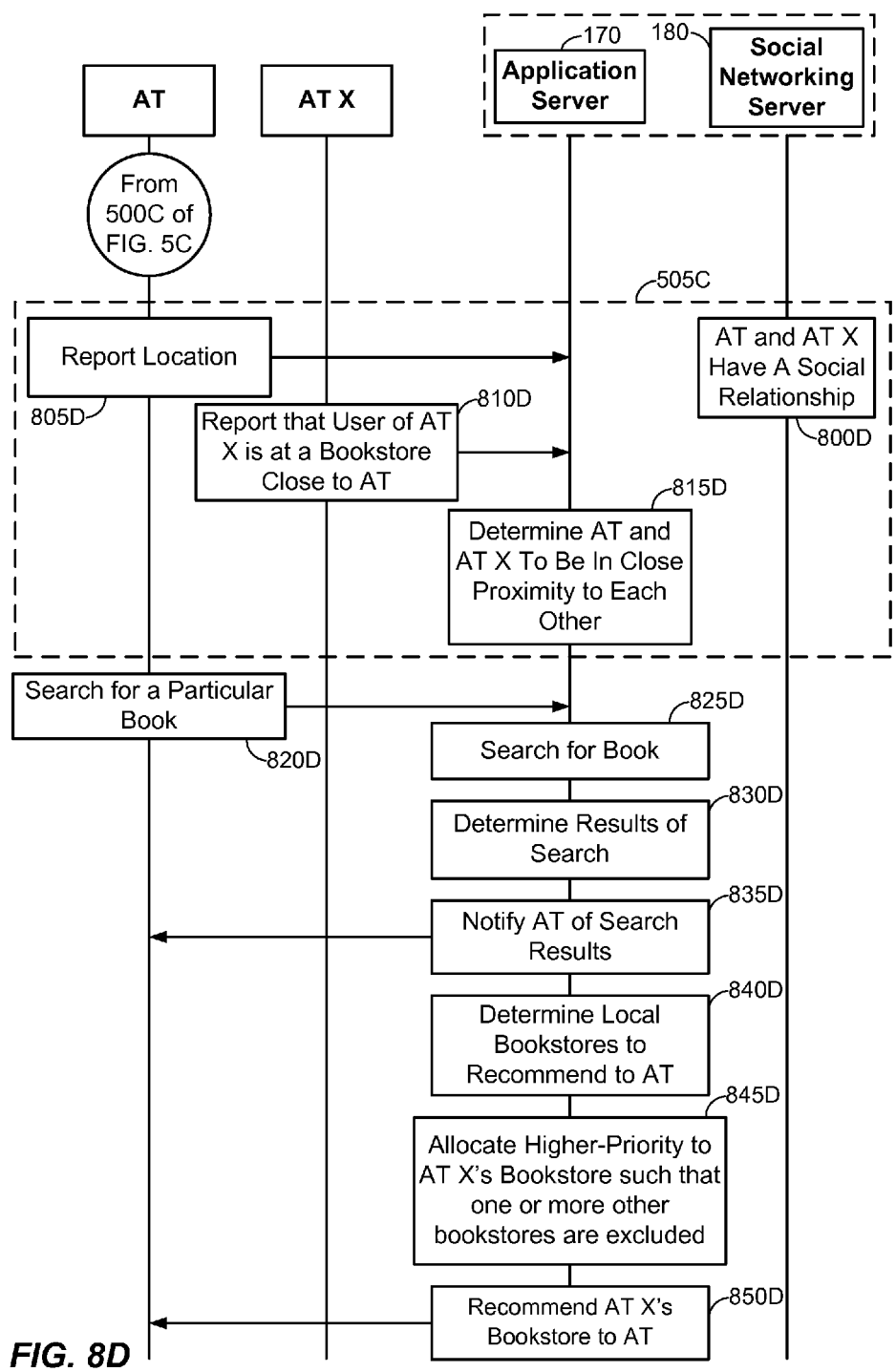

FIG. 8D illustrates a variation of FIG. 8C, whereby the given subscriber searches for a particular book instead of for a particular bookstore. Referring to FIG. 8D, assume that 800D through 815D correspond to 800C through 815C of FIG. 8C, respectively.

Next, assume that the given subscriber determines to search for a particular book of interest, such that the given subscriber manually enters book search criteria into the given AT, and the given AT sends the manually entered search criteria to the application server 170 in 820D (e.g., similar to 510C of FIG. 5C). The application server 170 receives the manually entered book search criteria from the given AT and performs searches for books that satisfy the book search criteria, 825D (e.g., as in 515C of FIG. 5C). The application server 170 determines the result of the book search (if any), 830D (e.g., as in 520C of FIG. 5C), and returns the book search results to the given AT for presentation to the given subscriber, 835D.

In FIG. 8D, the application server 170 can further attempt to determine content for recommendation to the given subscriber based on the manually entered book search criteria that is not technically a result of the search, but is still somehow related to the search. In this case, the application server 170 can determine local bookstores that are currently stocking the book of interest to the given subscriber.

Accordingly, the application server 170 searches for local bookstores to recommend to the given subscriber (i.e., bookstores stocking the book of interest) and determines the result(s) of the bookstore search (if any), in 840D. After obtaining the search results in 840D, the application server 170 selectively excludes or removes search results based on the passive behavior of the subscriber as monitored by the application server 170, 845D. In the embodiment of FIG. 8D, this means that the given bookstore is prioritized above other bookstores that satisfy the bookstore search criteria due to the given bookstore's known association with the given AT, which is inferred from (i) the user of AT X being a social contact of the given subscriber, (ii) the close proximity of the given AT with AT X and (iii) AT X's known location of the given bookstore. As a result, other bookstores are de-prioritized or 'excluded' due to the higher prioritization of the given bookstore. In other words, the given subscriber wants to find a particular book, and the application server 170 infers that the given subscriber can obtain this book at a bookstore. The application server 170 then tries to leverage the knowledge that a friend (or other social contact) of the given subscriber is already at a bookstore. Because AT X is already fairly close to the given AT, the application server 170 will attempt to direct the given subscriber to the given bookstore so that, in addition to the given subscriber obtaining his/her desired book, the given subscriber can also meet up with the user of AT X (potentially).

After selectively excluding search results in 845D, the application server 170 sends any remaining search results to the given AT for presentation to the given subscriber, 850D (e.g., as in 530C of FIG. 5C). As will be appreciated, in the embodiment of FIG. 8D, it is likely that the search results sent to the given AT by the application server 170 in 850D will include an indication of the given bookstore. Also, an indication that AT X is at the given bookstore already can also be sent to the given subscriber in 850D. While not shown in FIG. 8D explicitly, AT X can also be notified that the given subscriber is in the general area of AT X and is looking for a book, so that AT X could coordinate with the given AT to arrange a meeting with the given subscriber at the given bookstore, for instance.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a subscriber terminal (e.g., access terminal). In the alternative, the processor and the storage medium may reside as discrete components in a subscriber terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of managing privacy settings of subscribers for one or more social networking services, comprising:
   determining, by a server, a set of privacy settings of a first subscriber for the one or more social networking services;
   receiving, by the server, permission to dynamically modify the set of privacy settings of the first subscriber based on passive behavior of the first subscriber;
   monitoring, by the server, responsive to the received permission, the passive behavior of the first subscriber that is separate from interactions between the first subscriber and the one or more social networking services;
   triggering, by the server, a modification to the set of privacy settings of the first subscriber based on the received permission and the monitored passive behavior of the first subscriber;
   modifying the set of privacy settings of the first subscriber and a second subscriber based on the monitored passive behavior of the first subscriber for exchanging information between the first subscriber and the second subscriber, wherein the monitored passive behavior includes one or more of a call, a message exchange, and a cessation of interaction between the first subscriber and the second subscriber; and
   reverting, subsequent to the exchanging of the information, the modified set of privacy settings of the first subscriber and the second subscriber to their respective sets of privacy settings prior to the modification.

2. The method of claim 1, further comprising:
   determining content to be recommended to the first subscriber based on the monitored passive behavior of the first subscriber; and
   notifying the first subscriber of the determined content.

3. The method of claim 2, wherein the monitored passive behavior of the first subscriber used to determine the content to be recommended to the first subscriber includes location information of the first subscriber.

4. The method of claim 3, wherein the location information is indicative of a proximity of the first subscriber to a geographical landmark.

5. The method of claim 4, wherein the geographical landmark corresponds to a retail location.

6. The method of claim 1, further comprising:
determining that the first subscriber has manually entered a set of search criteria configured to search for search result data;
determining content to be recommended to the first subscriber based on the manually entered search criteria, wherein the determined content is separate from the search result data;
selectively excluding a portion of the determined content to be recommended to the first subscriber based on the monitored passive behavior of the first subscriber; and
notifying the first subscriber of the determined content.

7. The method of claim 1, wherein the monitored passive behavior of the first subscriber includes determining a location of the first subscriber.

8. The method of claim 7, further comprising:
determining a location of the second subscriber that has a social relationship with the first subscriber;
determining that the locations of the first subscriber and the second subscriber are within a threshold proximity of each other; and
notifying the first subscriber that the second subscriber is within the threshold proximity of the first subscriber.

9. The method of claim 1, further comprising:
increasing a priority of a given object based on the monitored passive behavior of the first subscriber;
determining that the first subscriber has manually entered a set of search criteria configured to search for search result data that is associated with the given object;
conducting the search based on the set of search criteria and obtaining search result data including a portion of search result data is related to the given object;
allocating a higher-priority to portion of the search result data related to the given object based on the increased priority of the given object.

10. The method of claim 9, wherein the increased priority corresponds to an increased social rank of the given object or a recognition that the given object is located within a proximity threshold of the first subscriber.

11. The method of claim 1, further comprising:
increasing a priority of a given object based on the monitored passive behavior of the first subscriber;
determining that the first subscriber has manually entered a set of search criteria configured to search for search result data;
determining content to be recommended to the first subscriber based on the manually entered search criteria, wherein the determined content is separate from the search result data and a portion of the determined content is related to the given object; and
allocating a higher-priority to the portion of the determined content based on the increased priority of the given object.

12. The method of claim 11, wherein the increased priority corresponds to an increased social rank of the given object or a recognition that the given object is located within a proximity threshold of the first subscriber.

13. The method of claim 1, wherein the determining, receiving, monitoring, triggering, and modifying are performed by a social networking server configured to support at least one of the one or more social networking services.

14. The method of claim 1, wherein the determining, receiving, monitoring, triggering, and modifying are performed by an application server that is separate from one or more social networking servers that are configured to support the one or more social networking services.

15. The method of claim 14,
wherein the one or more social networking services include a plurality of different social networking services, and
wherein the triggering is executed by the application server such that the set of privacy settings is modified across the plurality of different social networking services.

16. The method of claim 1, wherein the monitored passive behavior corresponds to one or more of a call made from or to the first subscriber, a text message, instant message or E-mail sent from or to the first subscriber, and a location of the first subscriber.

17. The method of claim 1, wherein the monitored passive behavior of the first subscriber relates to an interaction between the first subscriber and the second subscriber, and wherein the triggering of the modification to the set of privacy settings is based on an amount of the interaction.

18. The method of claim 1, wherein the monitored passive behavior of the first subscriber relates to an interaction between the first subscriber and the second subscriber that corresponds to a scheduled event associated with the first subscriber, and wherein the triggering of the modification to the set of privacy settings further comprises triggering a temporary modification to the set of privacy settings based on a time duration of the event.

19. An application server configured to manage privacy settings of subscribers for one or more social networking services, comprising:
means for determining a set of privacy settings of a first subscriber for the one or more social networking services;
means for receiving permission to dynamically modify the set of privacy settings of the first subscriber based on passive behavior of the first subscriber;
means for monitoring, responsive to the received permission, the passive behavior of the subscriber that is separate from interactions between the first subscriber and the one or more social networking services;
means for triggering a modification to the set of privacy settings of the first subscriber based on the received permission and the monitored passive behavior of the first subscriber;
means for modifying the set of privacy settings of the first subscriber and a second subscriber based on the monitored passive behavior of the first subscriber for exchanging information between the first subscriber and the second subscriber, wherein the monitored passive behavior includes one or more of a call, a message exchange, and a cessation of interaction between the first subscriber and the second subscriber; and
reverting, subsequent to the exchanging of the information, the modified set of privacy settings of the first subscriber and the second subscriber to their respective sets of privacy settings prior to the modification.

20. The application server of claim 19, wherein the application server is separate from one or more social networking servers that are configured to support the one or more social networking services.

21. An application server configured to manage privacy settings of subscribers for one or more social networking services, comprising:
a first processor module configured to determine a set of privacy settings of a first subscriber for the one or more social networking services;

a second processor module configured to receive permission to dynamically modify the set of privacy settings of the first subscriber based on passive behavior of the first subscriber;

a third processor module configured to monitor, responsive to the received permission, the passive behavior of the first subscriber that is separate from interactions between the first subscriber and the one or more social networking services;

a fourth processor module, comprising hardware, configured to trigger a modification to the set of privacy settings based on the received permission and the monitored passive behavior of the subscriber;

a fifth processor module, configured to modify the set of privacy settings of the first subscriber and a second subscriber based on the monitored passive behavior of the first subscriber for exchanging information between the first subscriber and the second subscriber, wherein the monitored passive behavior includes one or more of a call, a message exchange, and a cessation of interaction between the first subscriber and the second subscriber; and a sixth processor module, configured to revert, subsequent to the exchanging of the information, the modified set of privacy settings of the first subscriber and the second subscriber to their respective sets of privacy settings prior to the modification.

22. The application server of claim 21, wherein the application server is separate from one or more social networking servers that are configured to support the one or more social networking services.

23. A non-transitory computer-readable medium storing computer executable code to manage privacy settings of subscribers for one or more social networking services, comprising:

code for determining a set of privacy settings of a first subscriber for the one or more social networking services;

code for receiving permission to dynamically modify the set of privacy settings of the first subscriber based on passive behavior of the first subscriber;

code for monitoring, responsive to the received permission, the passive behavior of the first subscriber that is separate from interactions between the first subscriber and the one or more social networking services;

code for triggering a modification to the set of privacy settings based on the received permission and the monitored passive behavior of the first subscriber;

code for modifying the set of privacy settings of the first subscriber and a second subscriber based on the monitored passive behavior of the first subscriber for exchanging information between the first subscriber and the second subscriber, wherein the monitored passive behavior includes one or more of a call, a message exchange, and a cessation of interaction between the first subscriber and the second subscriber; and code for reverting, subsequent to the exchanging of the information, the modified set of privacy settings of the first subscriber and the second subscriber to their respective sets of privacy settings prior to the modification.

24. The computer-readable medium of claim 23, wherein the application server is separate from one or more social networking servers that are configured to support the one or more social networking services.

* * * * *